(12) United States Patent
Wagner et al.

(10) Patent No.: US 11,400,493 B2
(45) Date of Patent: *Aug. 2, 2022

(54) SYSTEMS AND METHODS FOR PROVIDING FOR THE PROCESSING OF OBJECTS IN VEHICLES

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/086,645

(22) Filed: Nov. 2, 2020

(65) Prior Publication Data
US 2021/0046512 A1 Feb. 18, 2021

Related U.S. Application Data

(63) Continuation of application No. 15/833,194, filed on Dec. 6, 2017, now Pat. No. 10,875,057.
(Continued)

(51) Int. Cl.
*B07C 5/38* (2006.01)
*B07C 5/36* (2006.01)
(Continued)

(52) U.S. Cl.
CPC ............ *B07C 5/362* (2013.01); *B07C 3/02* (2013.01); *B07C 5/02* (2013.01); *B07C 5/3412* (2013.01);
(Continued)

(58) Field of Classification Search
CPC ...... B65G 1/1378; B65G 61/00; B65G 67/02; B65G 2201/0285; B65G 2812/02633;
(Continued)

(56) References Cited

U.S. PATENT DOCUMENTS 3,734,286 A 5/1973 Simjian
4,136,780 A 1/1979 Hunter et al.
(Continued)

FOREIGN PATENT DOCUMENTS

AU 2006204622 A1 3/2007
CN 102390701 A 3/2012
(Continued)

OTHER PUBLICATIONS

Third Office Action, and its English Translation, issued by the National Intellectual Property Administration, P.R.C. in related Chinese Patent Application No. 201780075745.6 dated Sep. 16, 2021, 20 pages.
(Continued)

*Primary Examiner* — Joseph C Rodriguez
(74) *Attorney, Agent, or Firm* — Gesmer Updegrove LLP

(57) ABSTRACT

An object processing system within a trailer for a tractor trailer is disclosed. The object processing system includes an input area of the trailer at which objects to be processed may be presented, a perception system for providing perception
(Continued)

data regarding objects to be processed, and a primary transport system for providing transport of each object in one of at least two primary transport directions within the trailer based on the perception data.

30 Claims, 18 Drawing Sheets

Related U.S. Application Data

(60) Provisional application No. 62/430,664, filed on Dec. 6, 2016.

(51) Int. Cl.
| | |
|---|---|
| *B25J 9/16* | (2006.01) |
| *B07C 5/02* | (2006.01) |
| *B25J 9/00* | (2006.01) |
| *B07C 3/02* | (2006.01) |
| *B07C 5/34* | (2006.01) |
| *B65G 1/137* | (2006.01) |
| *B60P 3/00* | (2006.01) |

(52) U.S. Cl.
CPC ............... *B07C 5/38* (2013.01); *B25J 9/0018* (2013.01); *B25J 9/1679* (2013.01); *B60P 3/007* (2013.01); *B65G 1/1378* (2013.01)

(58) Field of Classification Search
CPC ..... B65G 2814/0311; B07C 1/02; B07C 1/04; B07C 3/008; B07C 3/02; B07C 3/06; B07C 3/08; B07C 5/02; B07C 5/36; B07C 5/361; B07C 5/362; B07C 5/38; B07C 2501/0063; B25J 9/0018; B25J 9/1679

See application file for complete search history.

(56) References Cited

U.S. PATENT DOCUMENTS

| | | | |
|---|---|---|---|
| 4,253,791 A | 3/1981 | Van Drie | |
| 4,722,653 A | 2/1988 | Williams et al. | |
| 4,759,439 A | 7/1988 | Hartlepp | |
| 4,819,784 A | 4/1989 | Sticht | |
| 4,832,553 A | 5/1989 | Grey | |
| 4,846,335 A | 7/1989 | Hartlepp | |
| 4,895,242 A | 1/1990 | Michel | |
| 4,936,735 A | 6/1990 | Ryan | |
| 5,190,162 A | 3/1993 | Hartlepp | |
| 5,419,457 A | 5/1995 | Ross et al. | |
| 5,460,271 A | 10/1995 | Kenny et al. | |
| 5,628,408 A | 5/1997 | Planke et al. | |
| 5,647,473 A * | 7/1997 | Miller ..................... B07C 5/02 |
| | | | 198/448 |
| 5,685,687 A | 11/1997 | Frye | |
| 5,794,788 A | 8/1998 | Massen | |
| 5,839,566 A | 11/1998 | Bonnet | |
| 6,006,946 A | 12/1999 | Williams et al. | |
| 6,087,608 A | 7/2000 | Schlichter et al. | |
| 6,208,908 B1 | 3/2001 | Boyd et al. | |
| 6,246,023 B1 | 6/2001 | Kugle | |
| 6,323,452 B1 | 11/2001 | Bonnet | |
| 6,390,756 B1 | 5/2002 | Isaacs et al. | |
| 6,401,936 B1 | 6/2002 | Isaacs et al. | |
| 6,505,093 B1 | 1/2003 | Thatcher et al. | |
| 6,554,123 B2 | 4/2003 | Bonnet | |
| 6,579,053 B1 | 6/2003 | Grams et al. | |
| 6,685,031 B2 | 2/2004 | Taikizawa | |
| 6,688,459 B1 | 2/2004 | Bonham et al. | |
| 6,705,528 B2 | 3/2004 | Good et al. | |
| 6,762,382 B1 | 7/2004 | Danelski | |
| 6,897,395 B2 | 5/2005 | Shilbashi et al. | |
| 6,946,612 B2 | 9/2005 | Morikawa | |
| 7,728,244 B2 | 6/2010 | De Leo et al. | |
| 8,281,553 B2 | 10/2012 | Kim | |
| 8,662,314 B2 | 3/2014 | Jones et al. | |
| 8,776,694 B2 | 7/2014 | Rosenwinkel et al. | |
| 8,811,722 B2 | 8/2014 | Perez Cortes et al. | |
| 8,972,045 B1 | 3/2015 | Mountz et al. | |
| 8,997,438 B1 | 4/2015 | Fallas | |
| 9,038,828 B2 | 5/2015 | Enenkel | |
| 9,102,336 B2 | 8/2015 | Rosenwinkel | |
| 9,346,083 B2 | 5/2016 | Stone | |
| 9,364,865 B2 | 6/2016 | Kim | |
| 9,378,607 B1 | 6/2016 | Wine et al. | |
| 9,481,518 B2 | 11/2016 | Neiser | |
| 9,486,926 B2 | 11/2016 | Kawano | |
| 9,492,923 B2 | 11/2016 | Wellman et al. | |
| 9,520,012 B2 | 12/2016 | Stiernagle | |
| 9,555,447 B2 | 1/2017 | Lykkegaard et al. | |
| 9,688,471 B2 | 6/2017 | Hellenbrand | |
| 9,744,669 B2 | 8/2017 | Wicks et al. | |
| 9,751,693 B1 | 9/2017 | Battles et al. | |
| 9,694,977 B2 | 10/2017 | Vogedes et al. | |
| 9,821,464 B2 | 11/2017 | Stiernagle et al. | |
| 9,878,349 B2 | 1/2018 | Crest et al. | |
| 9,911,246 B1 | 3/2018 | McBride et al. | |
| 9,926,138 B1 | 3/2018 | Brazeau et al. | |
| 9,931,673 B2 | 4/2018 | Nice et al. | |
| 9,937,532 B2 | 4/2018 | Wagner et al. | |
| 9,962,743 B2 | 5/2018 | Bombaugh et al. | |
| 9,975,148 B2 * | 5/2018 | Zhu ........................ B66F 9/063 |
| 9,999,977 B2 | 6/2018 | Wagner et al. | |
| 10,007,827 B2 | 6/2018 | Wagner et al. | |
| 10,029,865 B1 | 7/2018 | McCalib, Jr. et al. | |
| 10,058,896 B2 | 8/2018 | Hicham et al. | |
| 10,118,300 B2 | 11/2018 | Wagner et al. | |
| 10,127,514 B2 | 11/2018 | Napoli | |
| 10,137,566 B2 | 11/2018 | Bastian, II et al. | |
| 10,538,394 B2 * | 1/2020 | Wagner ................. B65G 47/12 |
| 10,875,057 B2 | 12/2020 | Wagner et al. | |
| 10,988,069 B2 * | 4/2021 | Vincent ................. B65G 13/02 |
| 10,988,327 B1 * | 4/2021 | Layne ................ B65G 47/5181 |
| 11,200,390 B2 * | 12/2021 | Wagner ................. B65G 47/82 |
| 2002/0087231 A1 | 7/2002 | Lewis et al. | |
| 2002/0092801 A1 | 7/2002 | Dominguez | |
| 2002/0134056 A1 | 9/2002 | Dimario et al. | |
| 2002/0157919 A1 | 10/2002 | Sherwin | |
| 2002/0179502 A1 | 12/2002 | Cerutti et al. | |
| 2003/0014376 A1 | 1/2003 | DeWitt et al. | |
| 2003/0029946 A1 | 2/2003 | Lieber et al. | |
| 2003/0034281 A1 | 2/2003 | Kumar | |
| 2003/0038065 A1 | 2/2003 | Pippin et al. | |
| 2003/0042112 A1 * | 3/2003 | Woerner .............. B65G 47/256 |
| | | | 198/446 |
| 2003/0075051 A1 | 4/2003 | Watanabe et al. | |
| 2003/0135300 A1 | 7/2003 | Lewis | |
| 2004/0065597 A1 | 4/2004 | Hanson | |
| 2004/0112719 A1 | 6/2004 | Gilmore et al. | |
| 2004/0194428 A1 | 10/2004 | Close et al. | |
| 2004/0261366 A1 | 12/2004 | Gillet et al. | |
| 2005/0002772 A1 | 1/2005 | Stone | |
| 2005/0149226 A1 | 7/2005 | Stevens et al. | |
| 2005/0220600 A1 | 10/2005 | Baker et al. | |
| 2005/0268579 A1 | 12/2005 | Natterer | |
| 2006/0070929 A1 | 4/2006 | Fry et al. | |
| 2008/0046116 A1 | 2/2008 | Khan et al. | |
| 2008/0181485 A1 | 7/2008 | Beis et al. | |
| 2008/0181753 A1 | 7/2008 | Bastian et al. | |
| 2008/0269960 A1 | 10/2008 | Kostmann | |
| 2010/0122942 A1 | 5/2010 | Harres et al. | |
| 2010/0125361 A1 | 5/2010 | Mougin et al. | |
| 2010/0276248 A1 | 11/2010 | Gut | |
| 2010/0318216 A1 | 12/2010 | Faivre et al. | |
| 2011/0144798 A1 | 6/2011 | Freudelsperger | |
| 2011/0238207 A1 | 9/2011 | Bastian II et al. | |
| 2011/0243707 A1 | 10/2011 | Dumas et al. | |
| 2011/0320036 A1 | 12/2011 | Freudelsperger | |
| 2012/0118699 A1 | 5/2012 | Buchmann et al. | |
| 2012/0177465 A1 | 7/2012 | Koholka | |
| 2012/0219397 A1 | 8/2012 | Baker | |
| 2012/0328397 A1 | 12/2012 | Yamashita | |

(56) References Cited

U.S. PATENT DOCUMENTS

| | | |
|---|---|---|
| 2013/0051696 A1 | 2/2013 | Garrett et al. |
| 2013/0110280 A1 | 5/2013 | Folk |
| 2013/0202195 A1 | 8/2013 | Perez Cortes et al. |
| 2013/0232919 A1 | 9/2013 | Jaconelli |
| 2014/0086709 A1 | 3/2014 | Kasai |
| 2014/0154036 A1 | 6/2014 | Matttern et al. |
| 2014/0166549 A1 | 6/2014 | Ito et al. |
| 2014/0244026 A1 | 8/2014 | Neiser |
| 2014/0277693 A1 | 9/2014 | Naylor |
| 2014/0291112 A1 | 10/2014 | Lyon et al. |
| 2014/0305847 A1 | 10/2014 | Kudrus |
| 2014/0360924 A1 | 12/2014 | Smith et al. |
| 2014/0364998 A1 | 12/2014 | Neiser et al. |
| 2015/0057793 A1 | 2/2015 | Kawano |
| 2015/0081090 A1 | 3/2015 | Dong |
| 2015/0114799 A1 | 4/2015 | Hansl et al. |
| 2015/0306634 A1 | 10/2015 | Maeda et al. |
| 2015/0346708 A1 | 12/2015 | Mattern et al. |
| 2015/0352717 A1 | 12/2015 | Mundt et al. |
| 2015/0352721 A1 | 12/2015 | Wicks et al. |
| 2015/0375880 A1 | 12/2015 | Ford et al. |
| 2016/0027093 A1 | 1/2016 | Creibier |
| 2016/0136816 A1 | 5/2016 | Pistorino |
| 2016/0199884 A1 | 7/2016 | Lykkegaard et al. |
| 2016/0221187 A1 | 8/2016 | Bradski et al. |
| 2016/0221762 A1 | 8/2016 | Schroader |
| 2016/0221766 A1 | 8/2016 | Schroader et al. |
| 2016/0228921 A1 | 8/2016 | Doublet et al. |
| 2016/0244262 A1 | 8/2016 | O'Brien et al. |
| 2016/0264366 A1 | 9/2016 | Heitplatz |
| 2016/0280477 A1 | 9/2016 | Pippin |
| 2016/0347545 A1 | 12/2016 | Lindbo et al. |
| 2017/0021499 A1 | 1/2017 | Wellman et al. |
| 2017/0043953 A1 | 2/2017 | Battles et al. |
| 2017/0057091 A1 | 3/2017 | Wagner et al. |
| 2017/0066597 A1 | 3/2017 | Hiroi |
| 2017/0073175 A1* | 3/2017 | Wicks ............... B25J 15/0052 |
| 2017/0080566 A1 | 3/2017 | Stubbs et al. |
| 2017/0080571 A1 | 3/2017 | Wagner et al. |
| 2017/0080579 A1 | 3/2017 | Wagner et al. |
| 2017/0087718 A1 | 3/2017 | Wagner et al. |
| 2017/0087731 A1 | 3/2017 | Wagner et al. |
| 2017/0106532 A1 | 4/2017 | Wellman et al. |
| 2017/0107056 A1* | 4/2017 | Kadaba ............... G06Q 50/28 |
| 2017/0120455 A1 | 5/2017 | Wagner et al. |
| 2017/0121113 A1 | 5/2017 | Wagner et al. |
| 2017/0136632 A1 | 5/2017 | Wagner et al. |
| 2017/0157648 A1 | 6/2017 | Wagner et al. |
| 2017/0157649 A1 | 6/2017 | Wagner et al. |
| 2017/0173638 A1 | 6/2017 | Wagner et al. |
| 2017/0197316 A1 | 7/2017 | Wagner et al. |
| 2017/0225330 A1 | 8/2017 | Wagner et al. |
| 2017/0305694 A1* | 10/2017 | McMurrough ...... B25J 15/0616 |
| 2017/0322561 A1 | 11/2017 | Stiernagle |
| 2017/0349385 A1 | 12/2017 | Moroni et al. |
| 2018/0085788 A1 | 3/2018 | Engel et al. |
| 2018/0127219 A1 | 5/2018 | Wagner et al. |
| 2018/0134501 A1 | 5/2018 | Ge et al. |
| 2018/0148272 A1 | 5/2018 | Wagner et al. |
| 2018/0194574 A1 | 7/2018 | Wagner et al. |
| 2018/0244473 A1 | 8/2018 | Mathi et al. |
| 2018/0265311 A1 | 9/2018 | Wagner et al. |
| 2018/0273295 A1 | 9/2018 | Wagner et al. |
| 2018/0273296 A1 | 9/2018 | Wagner et al. |
| 2018/0273297 A1 | 9/2018 | Wagner et al. |
| 2018/0273298 A1 | 9/2018 | Wagner et al. |
| 2018/0282065 A1 | 10/2018 | Wagner et al. |
| 2018/0282066 A1 | 10/2018 | Wagner et al. |
| 2018/0327198 A1 | 11/2018 | Wagner et al. |
| 2018/0330134 A1 | 11/2018 | Wagner et al. |
| 2018/0333749 A1 | 11/2018 | Wagner et al. |
| 2019/0022702 A1 | 1/2019 | Vegh et al. |
| 2019/0100368 A1 | 4/2019 | Zagar et al. |

FOREIGN PATENT DOCUMENTS

| | | |
|---|---|---|
| CN | 104743367 A | 7/2015 |
| CN | 204714016 U | 10/2015 |
| CN | 105905019 A | 8/2016 |
| CN | 205500186 U | 8/2016 |
| CN | 108602630 A | 9/2018 |
| DE | 19510392 A1 | 9/1996 |
| DE | 102004001181 A1 | 8/2005 |
| DE | 102005061309 A1 | 7/2007 |
| DE | 102006057658 A1 | 6/2008 |
| DE | 102007023909 A1 | 11/2008 |
| DE | 102007038834 A1 | 2/2009 |
| DE | 102010002317 A1 | 8/2011 |
| DE | 102010033115 A1 | 2/2012 |
| DE | 102012003160 A1 | 9/2012 |
| DE | 102011083095 A1 | 3/2013 |
| DE | 102012102333 A1 | 9/2013 |
| DE | 102014111396 A1 | 2/2016 |
| EP | 1695927 A2 | 8/2006 |
| EP | 1995192 A2 | 11/2008 |
| EP | 2256703 A1 | 12/2010 |
| EP | 2511653 A1 | 10/2012 |
| EP | 2745982 A2 | 6/2014 |
| EP | 3006379 A2 | 4/2016 |
| EP | 3112295 A1 | 1/2017 |
| FR | 2832654 A1 | 5/2003 |
| GB | 2084531 A | 4/1982 |
| JP | S54131278 A | 10/1979 |
| JP | S63310406 A | 12/1988 |
| JP | H0395001 A | 4/1991 |
| JP | H0776404 A | 3/1995 |
| JP | 2002028577 A | 1/2002 |
| JP | 2002175543 A | 6/2002 |
| JP | 2007182286 A | 7/2007 |
| JP | 2008080300 A | 4/2008 |
| KR | 101413393 B1 | 6/2014 |
| WO | 3074201 A1 | 9/2003 |
| WO | 2007009136 A1 | 1/2007 |
| WO | 2008091733 A2 | 7/2008 |
| WO | 2010017872 A1 | 2/2010 |
| WO | 2010034044 A2 | 4/2010 |
| WO | 2010099873 A1 | 9/2010 |
| WO | 2011038442 A2 | 4/2011 |
| WO | 2012024714 A2 | 3/2012 |
| WO | 2013178431 A1 | 12/2013 |
| WO | 2014111483 A1 | 7/2014 |
| WO | 2014166650 A1 | 10/2014 |
| WO | 2015118171 A1 | 8/2015 |
| WO | 2015162390 A1 | 10/2015 |
| WO | 2016067163 A1 | 5/2016 |
| WO | 2016100235 A1 | 6/2016 |
| WO | 2017036812 A1 | 3/2017 |
| WO | 2017044747 A1 | 3/2017 |
| WO | 2018176033 A1 | 3/2018 |

OTHER PUBLICATIONS

International Search Report and Written Opinion issued by the International Searching Authority dated Feb. 28, 2018 in related International Application No. PCT/US2017/064903, 16 pages.

International Preliminary Report on Patentability issued by the International Bureau of WIPO dated Jun. 11, 2019 in related International Application No. PCT/US2017/064903, 12 pages.

Communication pursuant to Rules 161(1) and 162 EPC issued by the European Patent Office dated Jul. 12, 2019, in related European Patent Application No. 17822107.3, 3 pages.

Non-Final Office Action issued by the U.S. Patent and Trademark Office dated Feb. 1, 2019 in related U.S. Appl. No. 15/833,194, 10 pages.

First Office Action, and its English Translation, issued by the National Intellectual Property Administration, P.R.C. dated Jun. 3, 2020 in related Chinese Patent Application No. 201780075745.6, 8 pages.

Non-Final Office Action issued by the U.S. Patent and Trademark Office dated Mar. 12, 2020 in related U.S. Appl. No. 15/833,194, 11 pages.

(56) References Cited

OTHER PUBLICATIONS

First Examiner's Report issued by Innovation, Science and Economic Development Canada in related Canadian Patent Application No. 3,045,522 dated Jul. 3, 2020, 5 pages.

Examiner's Report issued by Innovation, Science and Economic Development Canada in related Canadian Patent Application No. 3,045,522 dated Feb. 4, 2021, 3 pages.

Second Office Action, and its English Translation, issued by the National Intellectual Property Administration, P.R.C. in related Chinese Patent Application No. 201780075745.6 dated Feb. 19, 2021, 11 pages.

English Translation of Cn 105905019B retrieved from internet on Feb. 1, 2022.

Non-Final Office Action issued by the United States Patent and Trademark Office in related U.S. Appl. No. 17/086,648 dated Feb. 3, 2022, 9 pages.

Decision on Rejection, and its English Translation, issued by the National Intellectual Property Administration, P.R.C. in related Chinese Patent Application No. 201780075745.6 dated Mar. 3, 2022, 22 pages.

\* cited by examiner

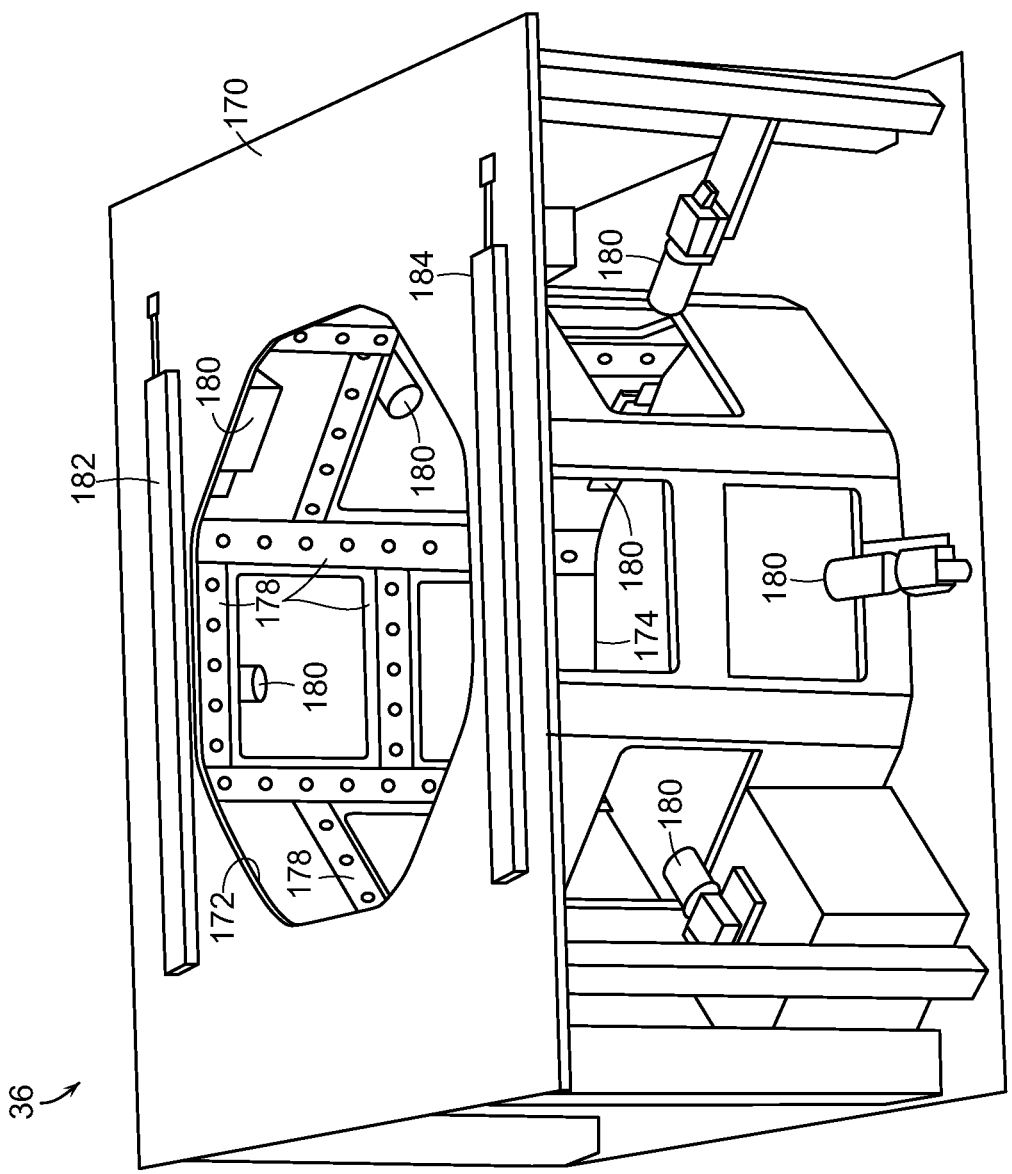

SYSTEMS AND METHODS FOR PROVIDING FOR THE PROCESSING OF OBJECTS IN VEHICLES

PRIORITY

The present application is a continuation of U.S. patent application Ser. No. 15/833,194, filed Dec. 6, 2017, which claims priority to U.S. Provisional Patent Application Ser. No. 62/430,664 filed Dec. 6, 2016, the disclosure disclosures of which are hereby incorporated by reference in its entirety their entireties.

BACKGROUND

The invention generally relates to automated, robotic and other object processing systems such as sortation systems, and relates in particular to automated and robotic systems intended for use in environments requiring, for example, that a variety of objects (e.g., parcels, packages, and articles etc.) be processed and distributed to several output destinations within a confined space.

Many parcel distribution systems receive parcels from a vehicle, such as a trailer of a tractor trailer. The parcels are unloaded and delivered to a processing station in a disorganized stream that may be provided as individual parcels or parcels aggregated in groups such as in bags, and may be provided to any of several different conveyances, such as a conveyor, a pallet, a Gaylord, or a bin. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels from the vehicle has traditionally been done, at least in part, by human workers that scan the parcels, e.g., with a hand-held barcode scanner, and then place the parcels at assigned locations. For example, many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the object, and then places the object in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Other ways of identifying items by code scanning either require manual processing, or require that the code location be controlled or constrained so that a fixed or robot-held code scanner (e.g., barcode scanner) can reliably detect it. Manually operated barcode scanners are generally either fixed or handheld systems. With fixed systems, such as those used at point-of-sale systems, the operator holds the object and places it in front of the scanner so that the barcode faces the scanning device's sensors, and the scanner, which scans continuously, decodes any barcodes that it can detect. If the object is not immediately detected, the person holding the object typically needs to vary the position or rotation of the object in front of the fixed scanner, so as to make the barcode more visible to the scanner. For handheld systems, the person operating the scanner looks for the barcode on the object, and then holds the scanner so that the object's barcode is visible to the scanner, and then presses a button on the handheld scanner to initiate a scan of the barcode.

Additionally, current distribution center sorting systems generally assume an inflexible sequence of operations whereby a disorganized stream of input objects is first singulated by human workers into a single stream of isolated objects presented one at a time to a human worker with a scanner that identifies the object. The objects are then loaded onto a conveyor, and the conveyor then transports the objects to the desired destination, which may be a bin, a chute, a bag or a destination conveyor.

In conventional parcel sortation systems, human workers typically retrieve parcels in an arrival order, and sort each parcel or object into a collection bin based on a set of given heuristics. For instance, all objects of like type might be routed to a collection bin, or all objects in a single customer order might be routed to a particular collection bin, or all objects destined for the same shipping destination, etc. may be routed to a particular collection bin. The human workers or automated routing systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation, and each tilt tray moves past a scanner. Each object is then scanned and moved to a pre-defined location assigned to the object. The tray then tilts to drop the object into the location. Other systems that include tilt trays may involve scanning an object (e.g., using a tunnel scanner), dropping the object into a tilt tray, associating the object with the specific tilt tray using a known location or position, for example, a using beam breaks, and then causing the tilt tray to drop the object when it is at the desired location.

Further, partially automated systems, such as the bombbay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; the trays then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object is mapped. There remains a need for a more efficient and more cost effective object sortation system that sorts objects of a variety of sizes and weights into appropriate collection bins or trays of fixed sizes, yet is efficient in handling objects of such varying sizes and weights.

Further, such systems do not adequately account for the overall process in which objects are first delivered to and provided at a processing station by a vehicle such as a trailer of a tractor trailer. Additionally, many processing stations, such as sorting stations for sorting parcels, are at times, at or near full capacity in terms of available floor space and sortation resources.

SUMMARY

In accordance with an embodiment, the invention provides an object processing system within a trailer for a tractor trailer. The object processing system includes an input area of the trailer at which objects to be processed may be presented, a perception system for providing perception data regarding objects to be processed, and a primary transport system for providing transport of each object in one of at least two primary transport directions within the trailer based on the perception data.

In accordance with another embodiment, the invention provides a system for providing processing of objects within a trailer for a tractor trailer. The system includes an input area within the trailer for receiving objects to be processed, a singulation system within the trailer for providing a singulated stream or objects within the trailer, and a perception system for receiving the singulated stream of objects within the trailer, and for generating perception data for facilitating the processing of the objects within the trailer.

In accordance with another embodiment, the invention provides a method of providing processing of objects within a trailer for a tractor trailer. The method includes the steps of: providing perception data regarding an object, transporting of the object in one of at least two primary directions based on the perception data, and transporting the object from the one of at least two primary directions into one of at least two secondary directions based on the perception data.

In accordance with a further embodiment, the invention provides a method of providing processing of objects within a trailer of a tractor trailer. The method includes the steps of: providing a singulated stream of objects within the trailer, providing perception data regarding an object, and transporting of the object in one of at least two primary directions within the trailer based on the perception data.

BRIEF DESCRIPTION OF THE DRAWINGS

The following description may be further understood with reference to the accompanying drawings in which:

FIG. 8 shows an illustrative diagrammatic rear view of the drop scanner system of FIG. 7;

Figure 1:
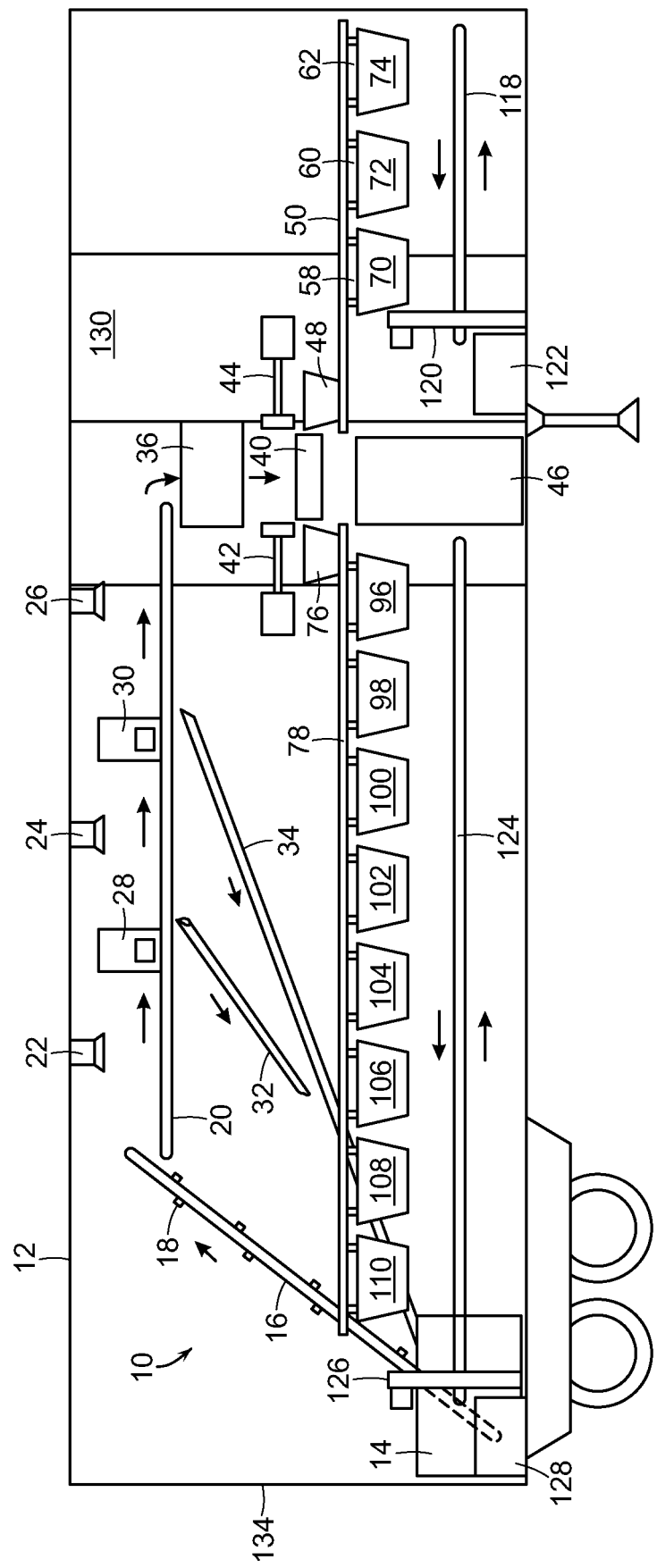
FIG. 1 shows an illustrative diagrammatic side view of a system in accordance with an embodiment of the present invention, with a side wall of a trailer removed.

The drawings are shown for illustrative purposes only.

DETAILED DESCRIPTION

In accordance with an embodiment, the invention provides a processing (e.g., sortation) system within a trailer of a tractor trailer, such that objects may be provided to the processing system, and processed within the trailer. For example, the trailer may include an input system for receiving a wide variety of objects to be sorted, a singulation system for providing a singulated stream of objects for efficient processing of the objects, an identification system, and routing system for delivering the objects to desired destinations. Generally, individual parcels need to be identified and conveyed to desired parcel-specific locations. The described systems reliably automate the identification and conveyance of such parcels, employing in certain embodiments, a set of conveyors and sensors and a scanning system. In short, applicants have discovered that when automating the sortation of objects, there are a few main things to consider: 1) the overall system throughput (parcels sorted per hour), 2) the number of diverts (i.e., number of discrete locations to which an object can be routed), 3) the total area of the sortation system (square feet), 4) sort accuracy, and 5) the capital and annual costs to run the system.

Sorting objects in a shipping distribution center is one application for automatically identifying and sorting parcels. In a shipping distribution center, parcels commonly arrive in trucks, totes, Gaylords or other vessels for delivery, are conveyed to sortation stations where they are sorted according to desired destinations, aggregated in bags, and then loaded back in trucks for transport to the desired destinations. Other applications may include the shipping department of a retail store or order fulfillment center, which may require that parcels be sorted for transport to different shippers, or to different distribution centers of a particular shipper. In a shipping or distribution center, the parcels may take a form of plastic bags, boxes, tubes, envelopes, or any other suitable container, and in some cases may also include objects not in a container. In a shipping or distribution center the desired destination is commonly obtained by reading identifying information printed on the parcel or on an attached label. In this scenario the destination corresponding to identifying information is commonly obtained by querying the customer's information system. In other scenarios the destination may be written directly on the parcel, or may be known through other means.

In accordance with various embodiments, therefore, the invention provides a method of taking individual parcels from a disorganized stream of parcels, providing a singulated stream of objects, identifying individual parcels, and sorting them to desired destinations, all within a confined location such as within a trailer of a tractor trailer. The invention further provides methods for conveying parcels from one point to the next, for excluding inappropriate or unidentifiable parcels, for grasping parcels, for determining grasp locations, for determining robot motion trajectories, for transferring parcels from one conveyor to another, for aggregating parcels and transferring to output conveyors, for digital communication within the system and with outside information systems, for communication with human operators and maintenance staff, and for maintaining a safe environment.

Figure 2:
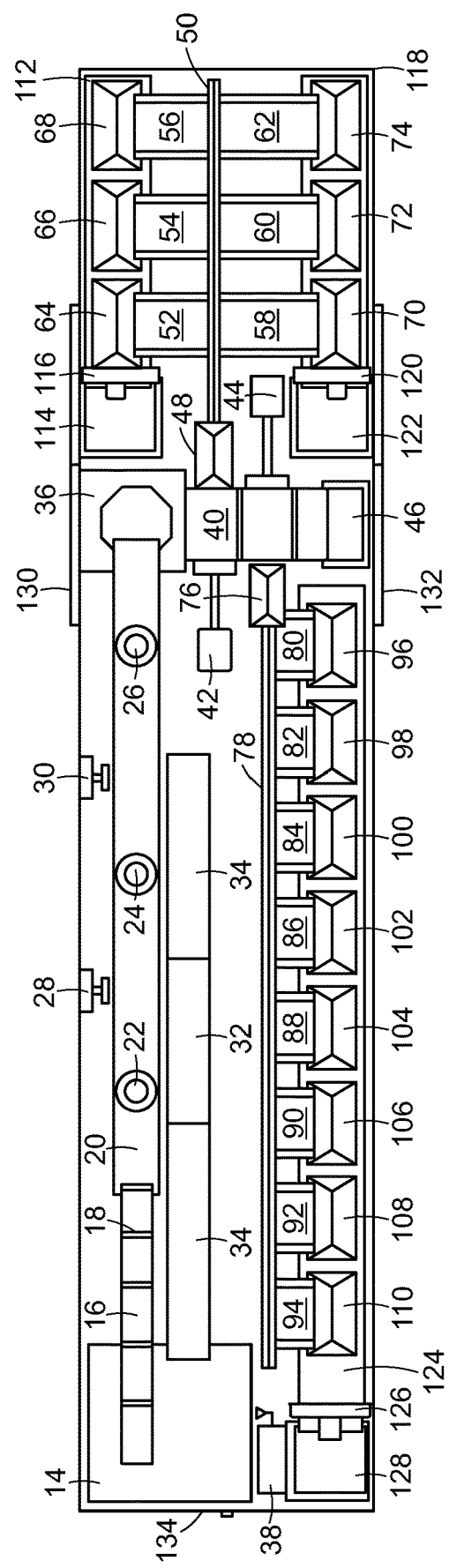
FIG. 2 shows an illustrative diagrammatic top view of the system of FIG. 1 with the top of the trailer removed.

Important components of an automated object identification and processing system, in accordance with an embodiment of the present invention, are shown in FIGS. 1 and 2. FIG. 1 shows a side view of the system 10 within a trailer 12 (with a wall of the trailer removed for clarity), and FIG. 2 shows a top view of the system 10 (with the top of the trailer removed for clarity). The system 10 includes an infeed hopper 14 into which objects may be dumped, e.g., by a dumper or Gaylord. An infeed cleated conveyor 16 conveys objects from the infeed hopper 12 to a primary conveyor 20. The infeed conveyor 16 may include baffles 18 or cleats for assisting in lifting the objects from the hopper 12 onto the primary conveyor 20. A primary perception system may include one or more perception units 22, 24, 26 that survey objects on the conveyor 20, in part, to identify certain objects for returning to the infeed hopper 14 so as to provide a singulated stream of objects. In particular, the system includes one or more diverters 28, 30 that may be selectively engaged to divert certain objects to return chutes 32, 34 for returning to the infeed hopper 14. A portion therefore, of the input stream is selectively adjusted by the diverters 28, 30 to provide a singulated stream of objects (as may be detected and confirmed by a perception unit 26).

The singulated stream of objects is delivered to a drop perception unit 36 (as discussed below) as a singulated stream and without requiring that a robotic system place objects into the drop perception unit. By providing a singulated stream of objects for processing, the system is able to more effectively control the object processing rate, and reducing the incidence of errors that may occur, for example of two objects in close contact with each other are perceived as being one object. The infeed conveyor 16 may also be in communication with a controller 38, and the speed of the infeed conveyor 16 as well as the speed (and even direction) of the primary conveyor 20 may be adjusted to either slow down if moving too fast, or speed up if system determines that more bandwidth exists for a faster input.

Objects then drop through the drop perception unit 36 and fall onto a secondary conveyor 40, and one or more diverters 42, 44 may be employed to divert each object in a desired direction. If an object on the conveyor 40 is not diverted, then the object will fall into an unsorted collection bin 46. When the diverter 42 is engaged to divert an object off of the conveyor 40, the object falls to a carriage 48 that reciprocally runs along a track 50. The contained object in the carriage 48 may then be selectively dumped onto one of a plurality of chutes 52, 54, 56, 58, 60, 62 toward a respective drop container 64, 66, 68, 70, 72, 74, which each include a bomb-bay style bottom drop floor as will be discussed in more detail below. When the diverter 44 is engaged to divert an object off of the conveyor 40, the object falls to a carriage 76 that reciprocally runs along a track 78. The contained object in the carriage 76 may then be selectively dumped onto one of a plurality of chutes 80, 82, 84, 86, 88, 90, 92, 94 toward a respective drop container 96, 98, 100, 102, 104, 106, 108, 110, which each include a bomb-bay style bottom drop floor.

When any of the drop containers 64, 66, 68 is full or otherwise complete and ready for further processing, the bottom of the ready container is dropped onto a conveyor 112 where the contents are moved toward a destination bin 114. Prior to reaching the destination bin 114 however, the contents are passed through an automatic bagging and labeling device 116 as will be discussed below in more detail. When any of the drop containers 70, 72, 74 is full or otherwise complete and ready for further processing, the bottom of the ready container is dropped onto a conveyor 118 where the contents are moved through an automatic bagging and labeling device 120 toward a destination bin 122. Further, when any of the drop containers 96, 98, 100, 102, 104, 106, 108, 110 is full or otherwise complete and ready for further processing, the contents of the ready container is dropped onto a conveyor 124 where the contents are moved through an automatic bagging and labeling device 126 toward a destination bin 128. The destination bin 114 may be accessed through doors 130 in the trailer, and the destination bins 120 (as well as the unsorted collection bin 46) may be accessed through doors 132 in the trailer. The destination bin 128 (as well as the input hopper 14 and the controller 38) may be accessed through doors 134 at the rear of the trailer.

Figure 3A:
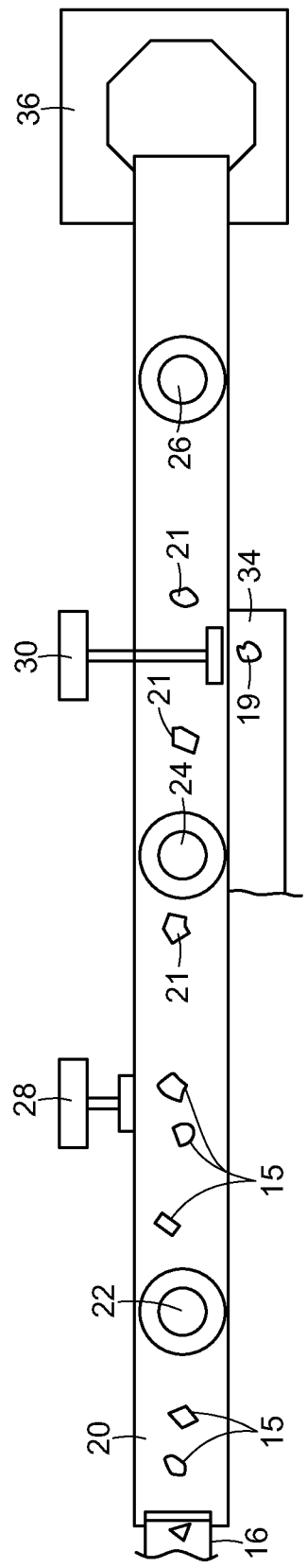
FIGS. 3A and 3B show illustrative diagrammatic top views of portions of the singulation system of the system of FIGS. 1 and 2.
Figure 3B:
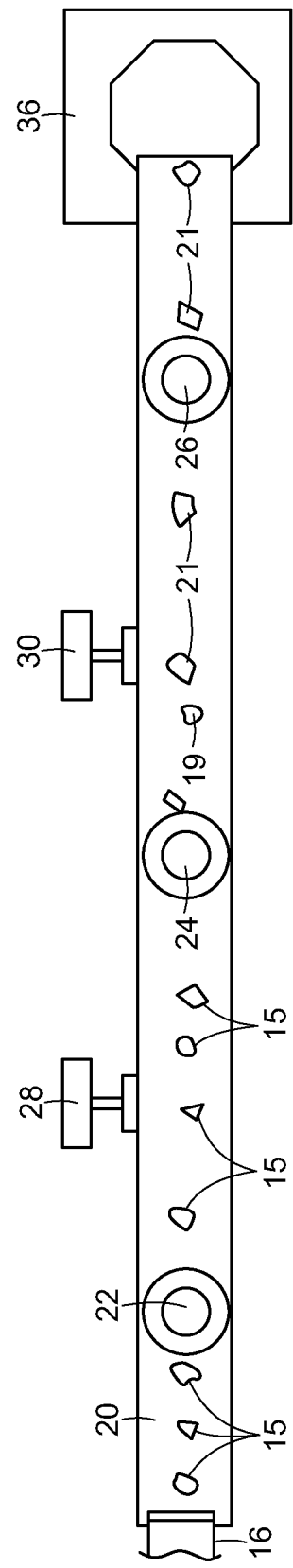

FIGS. 3A and 3B show the conveyor 20 advancing objects 15 from the infeed conveyor 16 either toward the drop scanner 36, or to be redirected via diverters to the infeed hopper 14. In particular, the system provides a singulated stream of objects (as shown at 17), by selectively removing certain objects (e.g., 19) by a diverter 28, 30, which move the objects 19 into a return chute 32, 34 (34 is shown) in FIG. 3A. As shown in FIG. 3A and later in FIG. 3B, this process leaves selected objects 21 in positions to provide a singulated stream of objects for dropping into the drop scanner 36. The speed and movement of the infeed conveyor 16, as well as the speed of the conveyor 20, may be monitored and controlled to facilitate providing the singulated stream of objects for the scanner 36.

Figure 4:
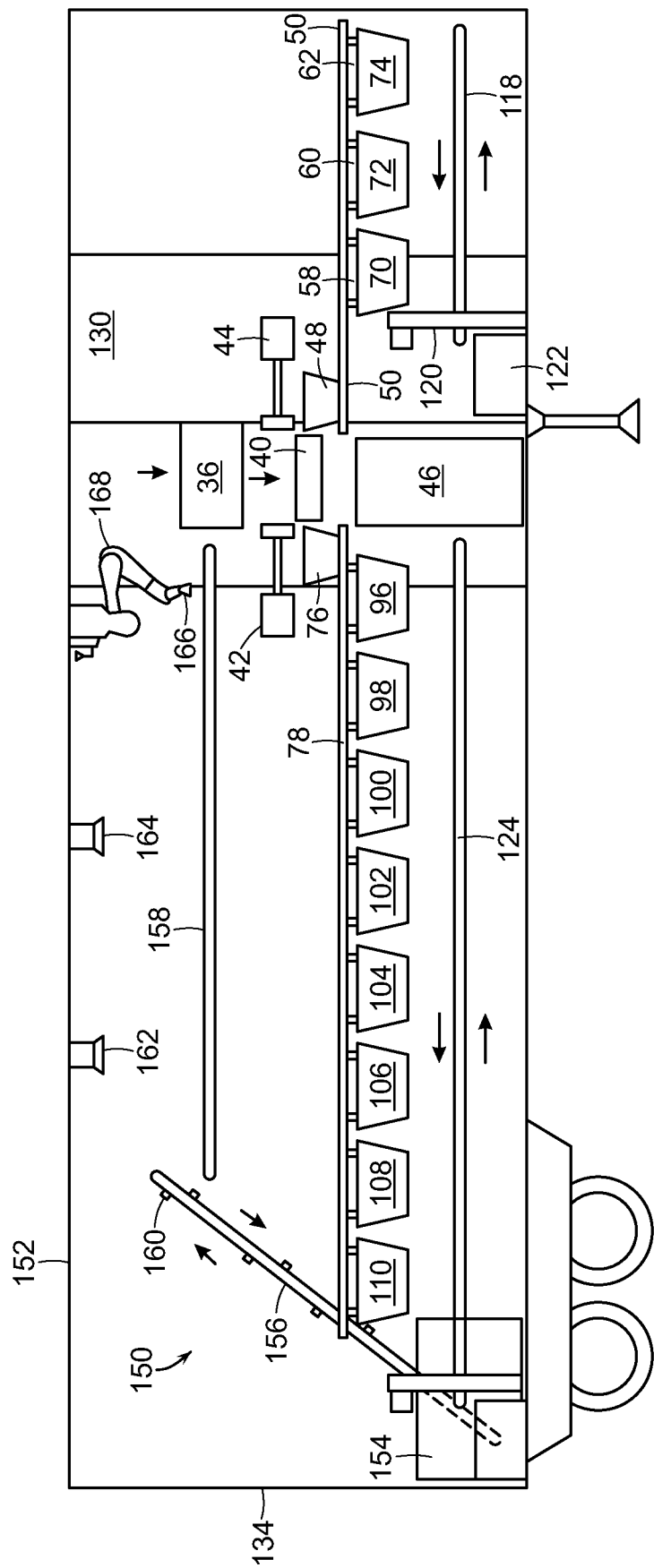
FIG. 4 shows an illustrative diagrammatic side view of a system in accordance with another embodiment of the present invention, with the side wall of the trailer removed.
Figure 5:
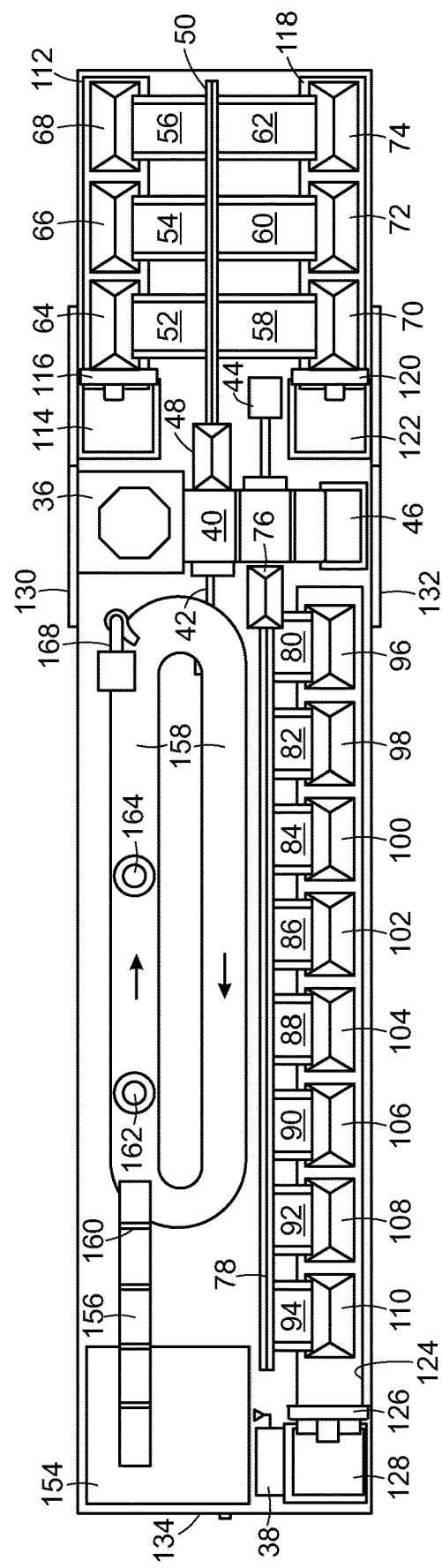
FIG. 5 shows an illustrative diagrammatic top view of the system of FIG. 4 with the top of the trailer removed.

FIGS. 4 and 5 show a system 150 in accordance with another embodiment of the present invention. In particular, FIG. 4 shows a side view of the system 150 within a trailer 152 (with a wall of the trailer removed for clarity), and FIG. 5 shows a top view of the system 150 (with the top of the trailer removed for clarity). The system 150 includes an infeed hopper 154 into which objects may be dumped, e.g., by a dumper or Gaylord. An infeed cleated conveyor 156 conveys objects from the infeed hopper 152 to a circular conveyor 158. The infeed conveyor 16 may include baffles 160 or cleats for assisting in lifting the objects from the hopper 152 onto the circular conveyor 158. A primary perception system may include one or more perception units 162, 164 that survey objects on the conveyor 158, in part, to identify certain objects for selection for inclusion in a singulated stream of objects that is provided directly to the drop perception unit 36. Objects remain on the conveyor 158 until they are selected for being grasped by an end effector 166 of a robotic system 168, and moved by the robotic system to be dropped into the drop perception unit 36.

Again, a singulated stream of objects are delivered to the drop perception unit 36 (as discussed below), and by providing a singulated stream of objects for processing, the system is able to more effectively control the object processing rate, and reducing the incidence of errors that may occur, for example of two objects in close contact with each other are perceived as being one object. The infeed conveyor 16 may also be in communication with a controller 38, and the speed of the infeed conveyor 16 as well as the speed (and even direction) of the circular conveyor 158 may be adjusted to either slow down if moving too fast, or speed up if system determines that more bandwidth exists for a faster input. The remaining portions of the system 150 having reference numerals from FIGS. 1 and 2, are the same as the portions of the system 10 of FIGS. 1 and 2. Briefly, objects are identified by perception unit 36, and then routed to one of carriages 48, 76, then to any of drop containers 64, 66, 68, 70, 72, 74, 96, 98, 100, 102, 104, 106, 108, 110, ultimately bagged and labeled (e.g., when each container is full) and provided to one of the destination bins 114, 122, 128.

Figure 6A:
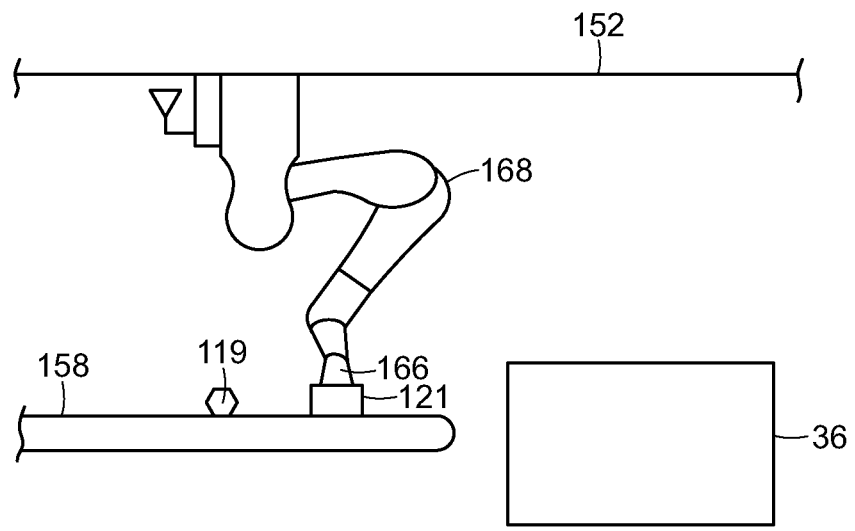
FIGS. 6A and 6B show illustrative diagrammatic views of portions of the pick and drop system of the system of FIGS. 4 and 5.
Figure 6B:
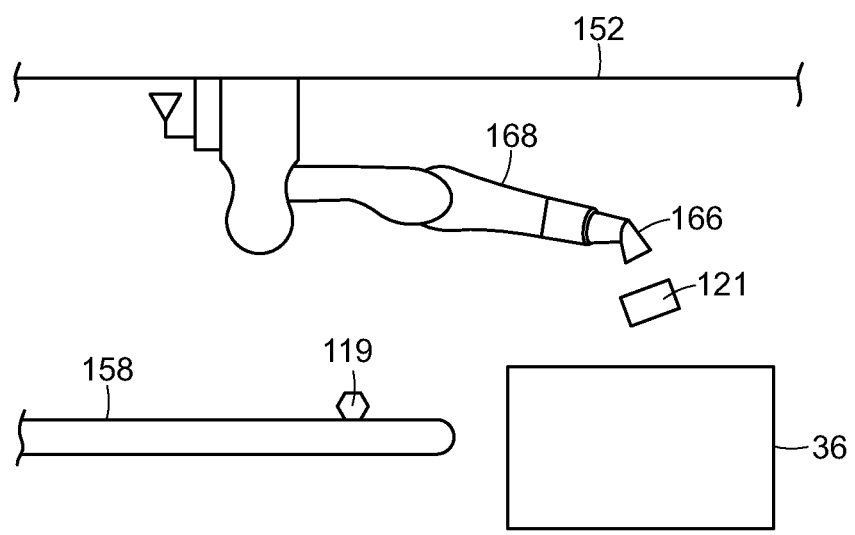

FIGS. 6A and 6B show the process of using a programmable motion system (such as robotic system) 168 having an end effector 166 that selectively grasps an object 121 to be processed (as shown in FIG. 6A), and moves the object 121 to the drop scanner 36 (as shown in FIG. 6B) where the object is dropped into the scanner 36 as shown. Other objects (e.g., 119) that are not selected for grasping and processing at that time remain on the circulating conveyor 158. Such objects may be processed at a later date, or may be designated as not to be processed. If one or more objects are designated as not to be processed (for whatever reason), the system may grasp the object(s) 119 and drop them into the scanner 36, not to be scanned, but simply to rout the object(s) 119 to the unsorted collection bin 46. In this case, the system 150 would know not to engage either of the diverters 42, 44. In each of the systems 10 and 150, therefore, a singulated stream of objects is provided from the drop scanner 36 onto the conveyor 40.

Figure 7:
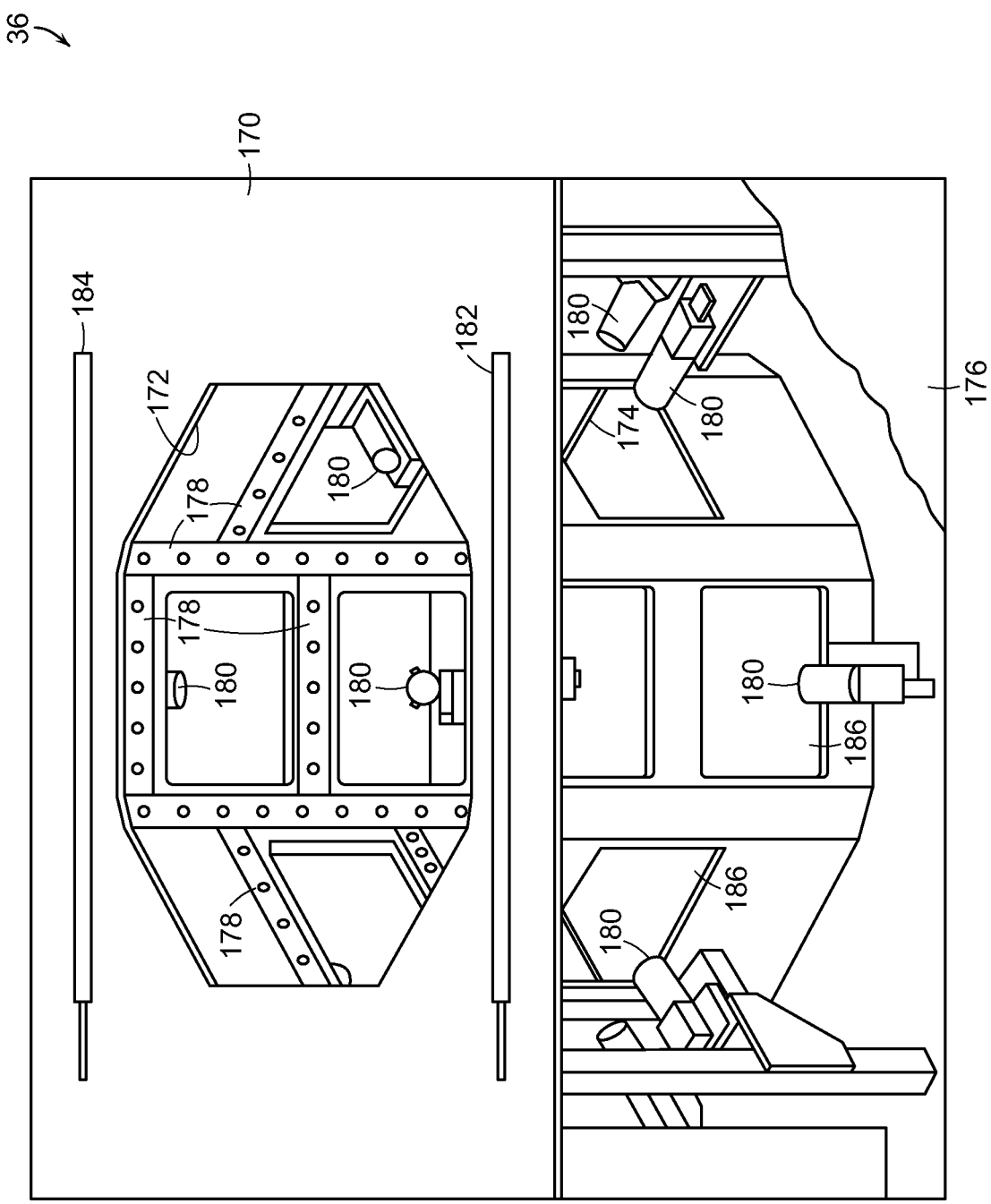
FIG. 7 shows an illustrative diagrammatic front view of the drop scanner system of FIGS. 1, 2, 4 and 5.

Portions of the systems 10 and 150 are described below in more detail. The perception unit 36 (which may be mounted to a side wall of the trailer, may be supported by stands or may be suspended from above) includes a structure 170 having a top opening 172 and a bottom opening 174, and the walls may be covered by an enclosing material 176 (e.g., a colored covering such as orange plastic, to protect humans from potentially dangerously bright lights within the perception unit 36) as shown in FIGS. 7 and 8. The structure 170 includes a plurality of rows of sources (e.g., illumination sources such as LEDs) 178 as well as a plurality of image perception units (e.g., cameras) 180. The sources 178 are provided in rows, and each is directed toward the center of the opening. The perception units 180 are also generally directed toward the opening, although some cameras are directed horizontally, while others are directed upward, and some are directed downward. The system also includes an entry source (e.g., infrared source) 182 as well as an entry detector (e.g., infrared detector) 184 for detecting when an object has entered the perception unit 36. The LEDs and cameras therefore encircle the inside of the structure 170, and the cameras are positioned to view the interior via windows that may include a glass or plastic covering (e.g., 186).

An important aspect of systems of certain embodiments of the present invention, is the ability to identify via barcode or other visual markings of objects, unique indicia associated with the object by employing a perception system into which objects may be dropped. Automated scanning systems would be unable to see barcodes on objects that are presented in a way that their barcodes are not exposed or visible. The perception system may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with unique indicia such as a unique code (e.g., barcode) or a unique destination (e.g., address) of the object.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor.

The manner in which outbound objects are organized is such that objects are placed in a bin, shelf location or container, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from unique identifying indicia (identify or destination, such as a bar code or a unique address), which identifies the object or it's destination.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with unique identifying indicia (identity or destination).

The operations of the systems described herein are coordinated by the central control system 38 as shown in FIGS. 2 and 5. This system determines from symbol strings the unique indicia associated with an object, as well as the outbound destination for the object. The central control system is comprised of one or more workstations or central processing units (CPUs). The correspondence between unique identifying indicia and outbound destinations is maintained by the central control system in a database called a manifest. The central control system maintains the manifest by communicating with a warehouse management system (WMS).

During operation, the broad flow of work may be generally as follows. First, the system is equipped with a manifest that provides the outbound destination for each inbound object. Next, the system waits for inbound objects to arrive either in a bin or on a conveyor. The robotic system may pick one item at a time from the input bin, and may drop each item into the perception system discussed above. If the perception system successfully recognizes a marking on the object, then the object is then identified and forwarded to a sorting station or other processing station. If the object is not identified, the robotic system may either replace the object back onto the input conveyor and try again, or the conveyor may divert the object to a human sortation bin to be reviewed by a human.

The sequence of locations and orientations of the perception units 36 are chosen so as to minimize the average or maximum amount of time that scanning takes. Again, if the object cannot be identified, the object may be transferred to a special outbound destination for unidentified objects, or it may be returned to the inbound stream. This entire procedure operates in a loop until all of the objects in the inbound set are depleted. The objects in the inbound stream are automatically identified, sorted, and routed to outbound destinations.

In accordance with an embodiment therefore, the invention provides a system for sorting objects that arrive inbound bins and that need to be placed into a shelf of outbound bins, where sorting is to be based on a unique identifier symbol. Key specializations in this embodiment are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked.

The two key performance characteristics may be optimized for a given item set and method of barcode labeling. Parameters of the optimization for a barcode system include how many barcode scanners, where and in what orientation to place them, and what sensor resolutions and fields of view for the scanners to use. Optimization can be done through trial and error, or by simulation with models of the object.

Optimization through simulation employs a barcode scanner performance model. A barcode scanner performance model is the range of positions, orientations and barcode element size that a barcode symbol can be detected and decoded by the barcode scanner, where the barcode element size is the size of the smallest feature on the barcode. These are typically rated at a minimum and maximum range, a maximum skew angle, a maximum pitch angle, and a minimum and maximum tilt angle.

Typical performance for camera-based barcode scanners are that they are able to detect barcode symbols within some range of distances as long as both pitch and skew of the plane of the symbol are within the range of plus or minus 45 degrees, while the tilt of the symbol can be arbitrary (between 0 and 360 degrees). The barcode scanner performance model predicts whether a given barcode symbol in a given position and orientation will be detected.

The barcode scanner performance model is coupled with a model of where barcodes would expect to be positioned and oriented. A barcode symbol pose model is the range of all positions and orientations, in other words poses, in which a barcode symbol will expect to be found. For the scanner, the barcode symbol pose model is itself a combination of an article gripping model, which predicts how objects will be held by the robotic system, as well as a barcode-item appearance model, which describes the possible placements of the barcode symbol on the object. For the scanner, the barcode symbol pose model is itself a combination of the barcode-item appearance model, as well as an inbound-object pose model, which models the distribution of poses over which inbound articles are presented to the scanner. These models may be constructed empirically, modeled using an analytical model, or approximate models may be employed using simple sphere models for objects and a uniform distribution over the sphere as a barcode-item appearance model.

Figure 9A:
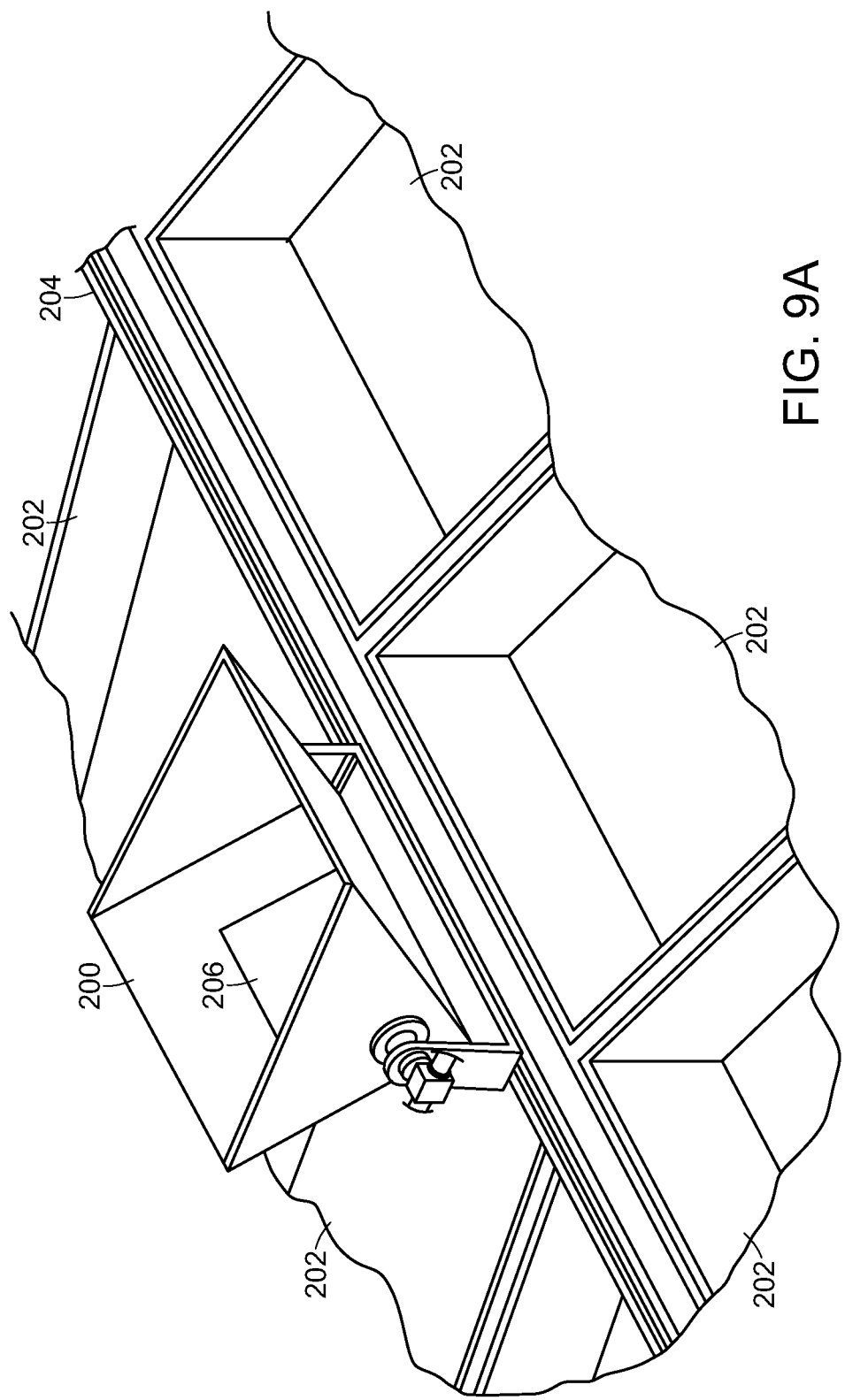
FIGS. 9A and 9B show illustrative diagrammatic views of a shuttle system of the system of FIGS. 1, 2, 4 and 5, wherein a carriage moves between bins (FIG. 9A), and drops an object into a bin (FIG. 9B)
Figure 9B:
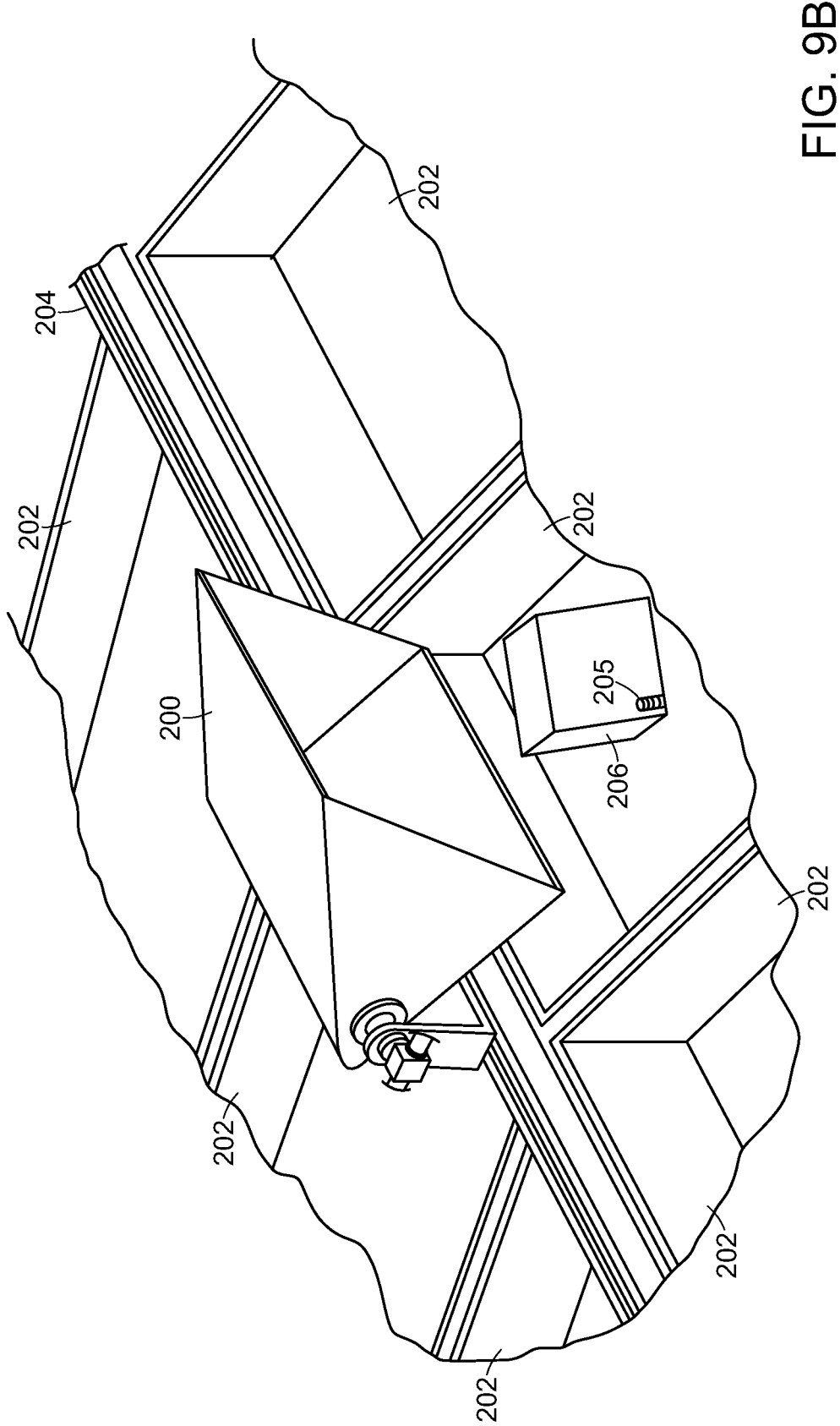

As further shown with reference to FIGS. 9A and 9B, each shuttle section (e.g., carriage 48 on track 50 and carriage 76 on track 78) includes a carriage (labelled 200 in FIGS. 9A and 9B) that shuttles back and forth among destination chutes 202 on track 204 (e.g., tracks 50, 78). The carriage 200 travels along the track 204 and carries objects to a desired destination chute, and tilts, dropping a contained object 206 into the desired destination chute (as shown in FIG. 9B). Each object is associated with unique identifying indicia (e.g., 205) that identifies the object with an identity or destination. The chutes (e.g., chutes 52, 54, 56, 58, 60, 62, 80, 82, 84, 86, 88, 90, 92, 94 of FIGS. 1-4) lead to drop containers (e.g., drop containers 64, 66, 68, 70, 72, 74, 80, 82, 84, 86, 88, 90, 92, 94 of FIGS. 1-6). The central computing and control station 38 (shown in FIGS. 2 and 4) communicates with other computers distributed in the other components, and also communicates with the customer information system, provides a user interface, and coordinates all processes.

Figure 10A:
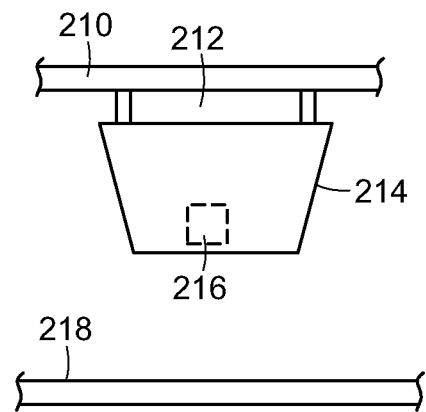
FIGS. 10A and 10B show illustrative diagrammatic side views of a drop carrier of the systems of FIGS. 1, 2, 4 and 5, wherein the drop carrier moves an object (FIG. 10A) and drops an object onto an output conveyor (FIG. 10B)
Figure 10B:
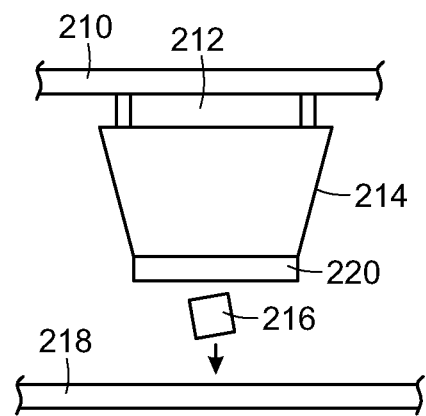

With reference to FIGS. 10A and 10B, the drop containers of the systems of FIGS. 1-6 may operate as follows. After a carriage (e.g., 48, 76, 200) on a track 210 (e.g., track 50, 78) drops an object into a chute 212 (e.g., chutes 52, 54, 56, 58, 60, 62, 80, 82, 84, 86, 88, 90, 92, 94), the object 216 lands in a drop container (e.g., drop containers 64, 66, 68, 70, 72, 74, 96, 98, 100, 102, 104, 106, 108, 110, 214). When the system determines that the drop container needs to be emptied, doors 220 on the bottom of the drop container 214 open, and the contents (e.g., object 216), fall to a conveyor 218 (e.g., conveyor 112, 118, 124), on which the contents travel toward destination bin (e.g., 114, 122, 128).

Figure 11A:
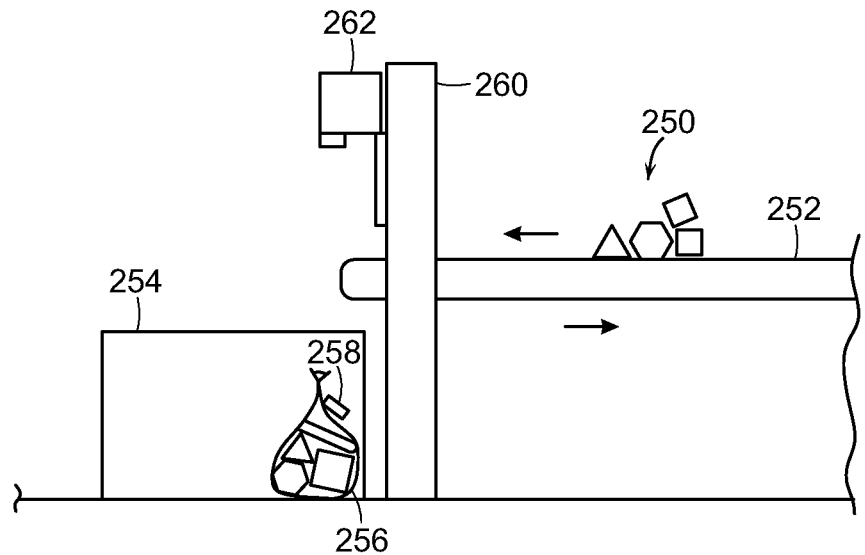
FIGS. 11A-11D show illustrative diagrammatic side views of a bagging and labelling system of the systems of FIGS. 1, 2, 4 and 5.
Figure 11B:
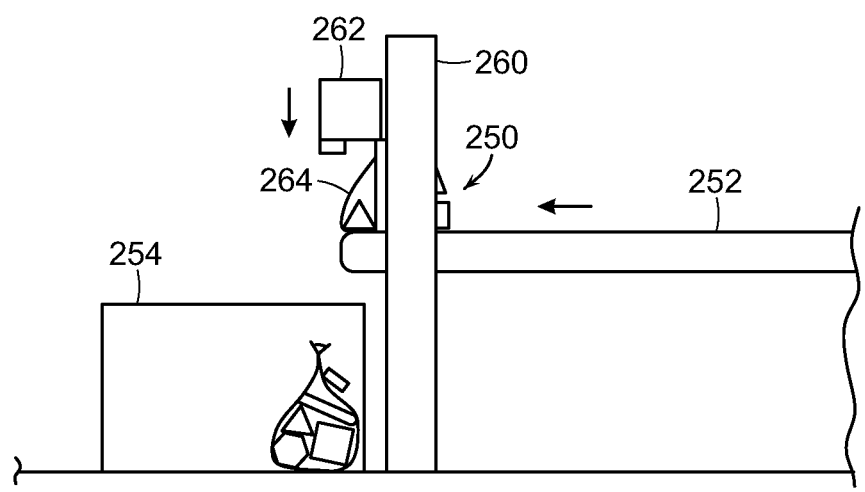
Figure 11C:
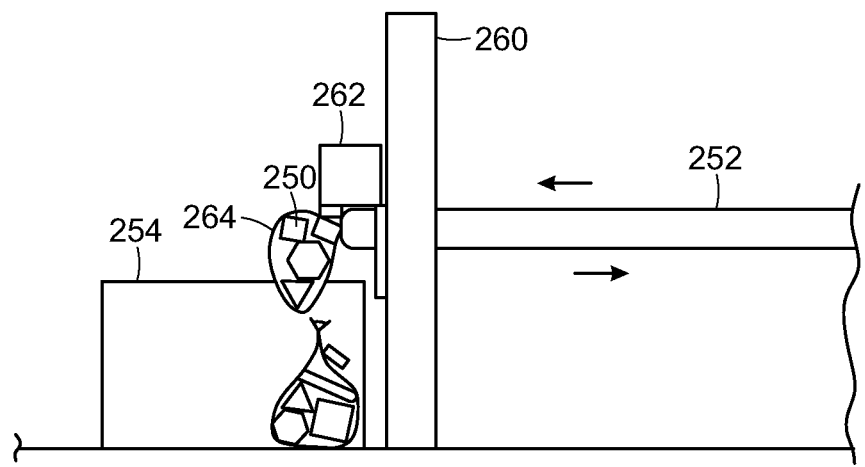
Figure 11D:
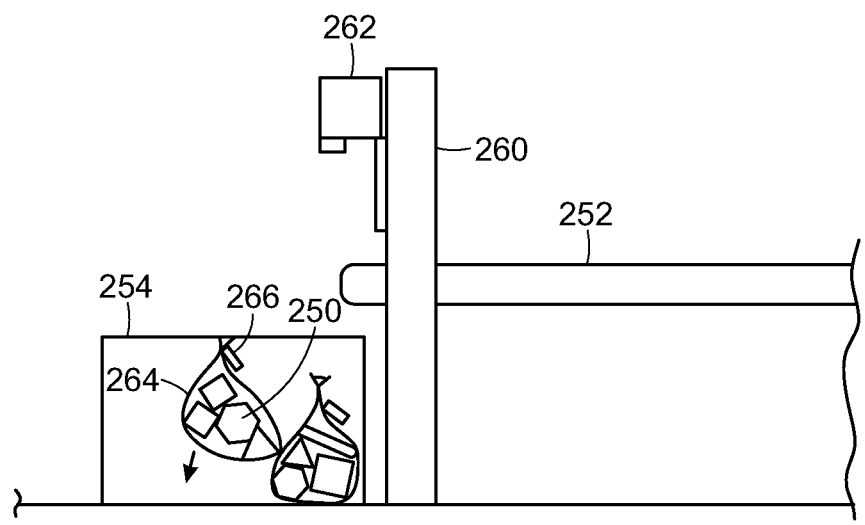

FIGS. 11A-11D show the operation of the automated bagging and labeling systems 116, 120, 126 of FIGS. 1-4). In particular, a conveyor 252 (e.g., conveyor 112, 118, 124) objects 250 (that came from a single destination bin) toward a destination bin 254 into which bagged and labelled objects are collected (e.g., bag 256 of objects bearing a label 258). Before dropping into the destination bin 254, the objects 250 pass through a bagging and labelling station 260 (e.g., bagging and labelling systems 116, 122, 126 of FIGS. 1-6). As the objects 250 pass through (FIG. 11B), they encounter a plastic sheet 264, which forms a bag around the objects with the assistance of an automated seal and labeling unit 262, which moves down toward the objects as they pass through the station 260. With reference to FIG. 11C, as the objects pass through the station 260, the ends of the plastic sheet 264 are brought together and sealed by the automated seal and labeling unit 262, which presses on the collected ends of the now formed bag, and prints and attaches a label 266 on the bag 262 of objects 250. The labelled and bagged group of objects 250 are then dropped into the destination bin 254 as shown in FIG. 11D, and the automated seal and labeling unit 262 returns to the starting position. The labelled bags of objects may periodically be removed from the truck for further processing.

Figure 12A:
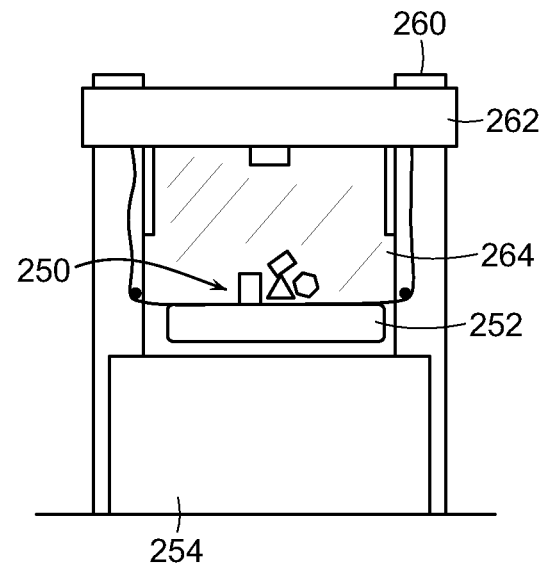
FIGS. 12A-12F show illustrative diagrammatic end views of the bagging and labelling system of FIGS. 1, 2, 4 and 5.
Figure 12B:
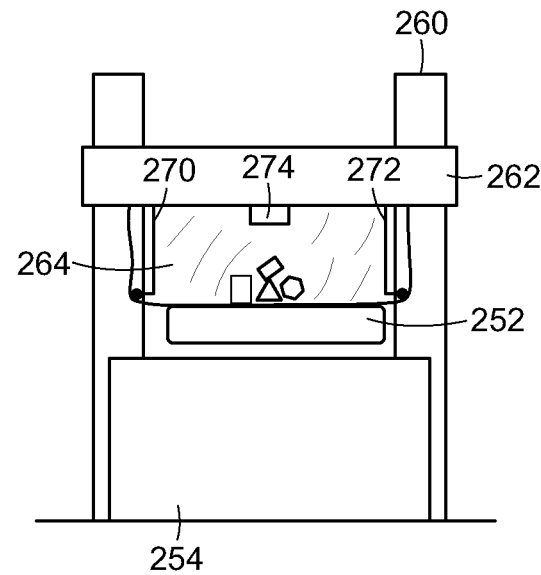
Figure 12C:
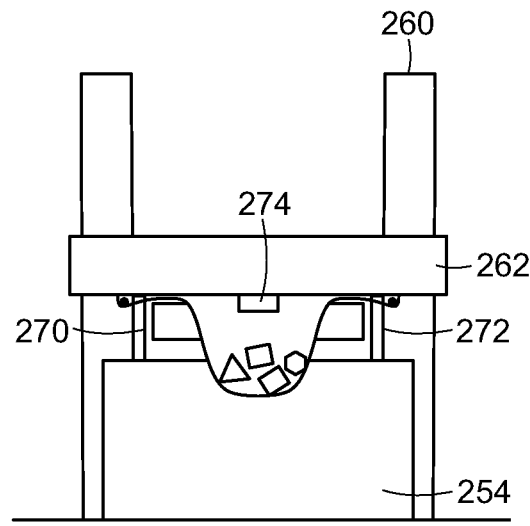
Figure 12D:
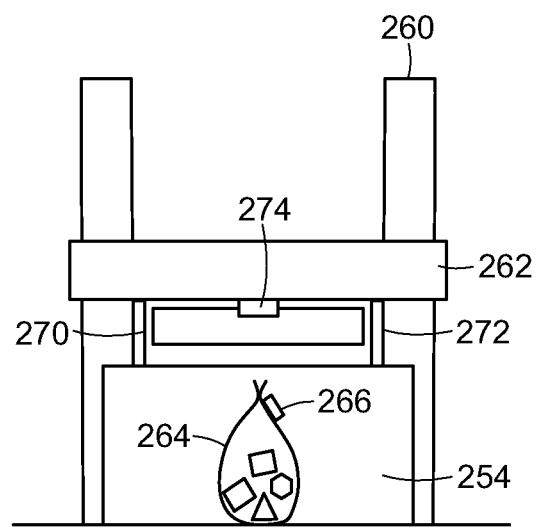
Figure 12E:
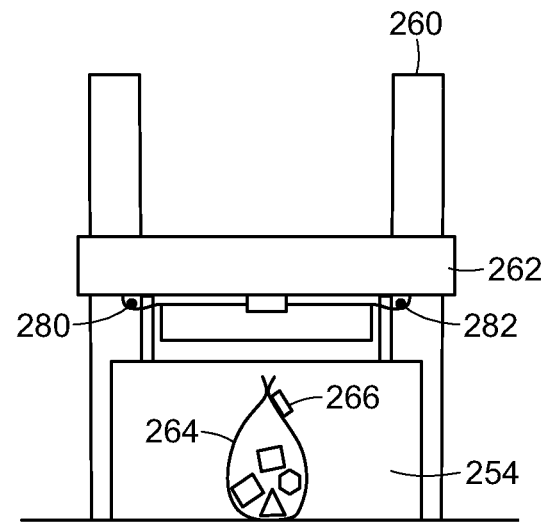
Figure 12F:
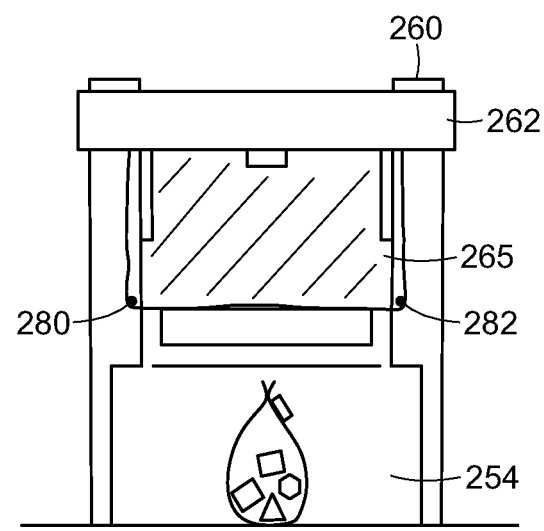

FIGS. 12A-12F further show front views of the process (shown in side views in FIGS. 11A-11D) of bagging groups of objects and sealing and labelling the bags. In particular, the objects 250 travel along conveyor 252 (FIGS. 11A and 12A), and contact the plastic sheet 264 as the unit 262 is being lowered (FIGS. 11B and 12B). The edges of the plastic sheet 264 are sealed by sealers 270, 272, and the top is cinched together and sealed by the sealing and labeling unit 274 (FIGS. 11C and 12C) that seals the bag and prints the adhesive label 266 that is applied to the bag (FIGS. 11D and 12D). With reference to FIGS. 12E and 12F, a new sheet 265 is then anchored to anchors 280, 282 (e.g., adhesive anchors), and the unit 262 is raised, forming the new sheet 265 (FIG. 12F) for forming a new bag.

Figure 13:
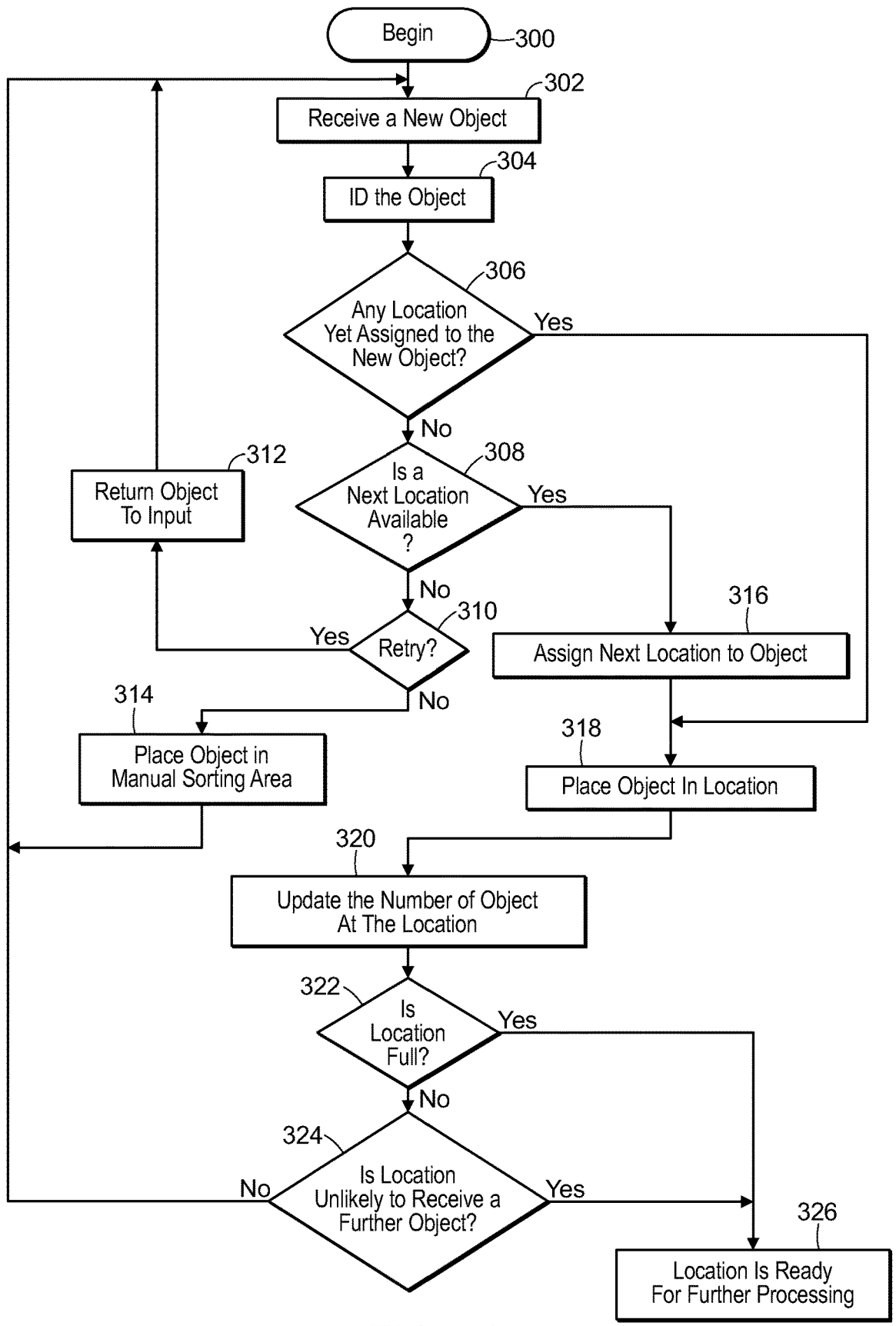
FIG. 13 shows an illustrative diagrammatic view of a flowchart showing selected processing steps in a system in accordance with an embodiment of the present invention.

As shown in FIG. 13, a sortation process of the invention at a sorting station may begin (step 300) by having a robotic system select, and grasp a new object from the input buffer (step 302) and then identify the new object (step 304). In certain embodiments, the system may first identify a new object and then select and grasp the identified object. The system then will determine whether the object is yet assigned to any collection bin (step 306). If not, the system will determine whether a next bin is available (step 308). If no next bin is available and the system decides to retry the object later (step 310), the robotic system will return the object to the input buffer (step 312) and return to step 302. If the system elects to not retry (step 310), the object is placed in a manual sorting area (step 314). Alternatively, the system can pick one of the collection bins that is in process and decide that it can be emptied to be reused for the object in hand, at which point the control system can empty the collection bin or signal a human worker to do it.

If a next bin is available (and the system may permit any number of bins per station), the system will then assign the object to a next bin (step 316). The system then places the object into the assigned bin (step 318), and updates the number of objects in the bin (step 320). The system them determines whether the bin is full (step 322) and if not, determines whether the bin is unlikely to receive a further object in the near future (step 324). If the answer to either is yes, the system indicates that the bin is ready for further processing (step 326). Otherwise, the system then returns to step 302 until finished.

Figure 14:
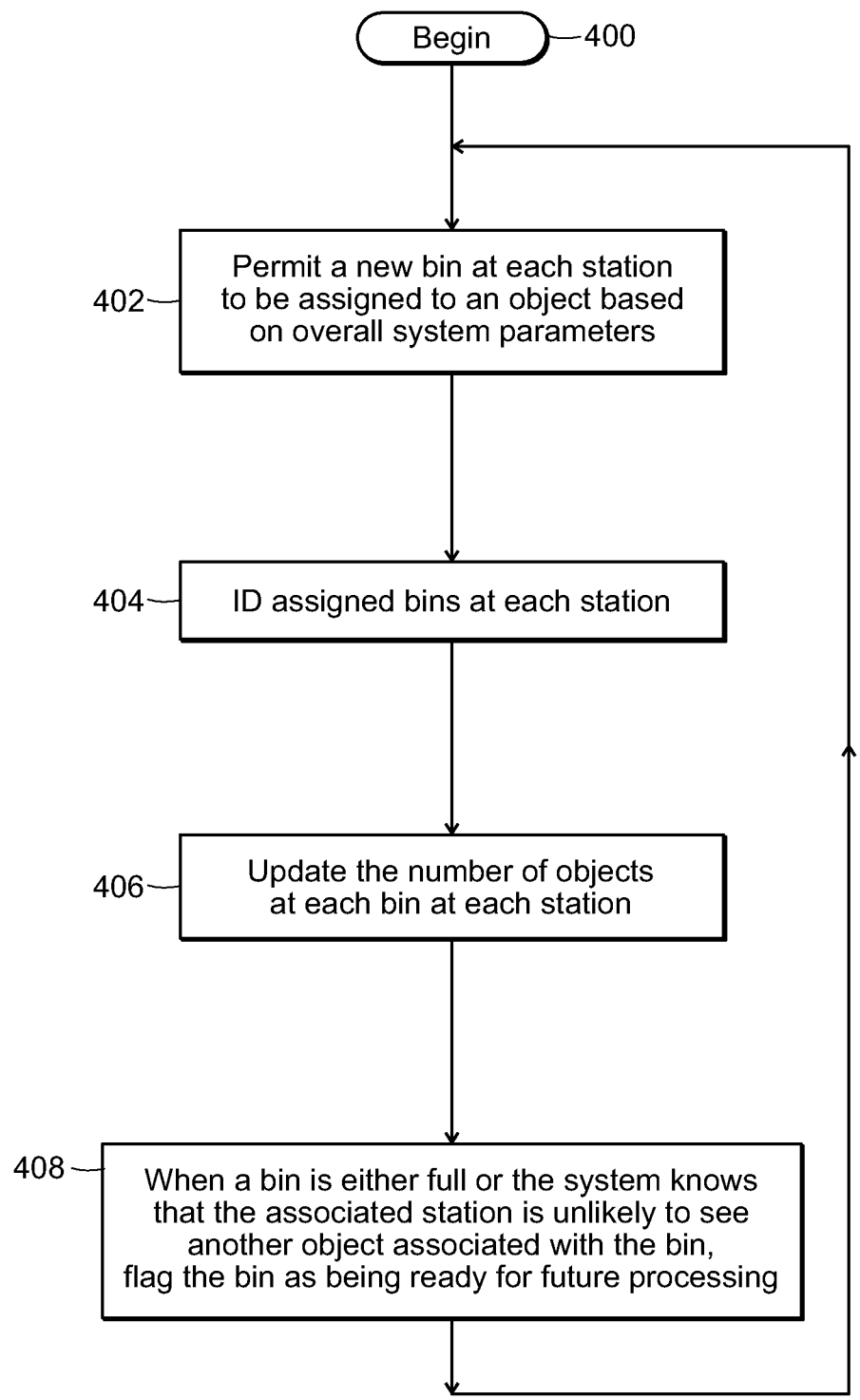
FIG. 14 shows an illustrative diagrammatic view of a flowchart showing bin assignment and management steps in a system in accordance with an embodiment of the present invention.

A process of the overall control system is shown, for example, in FIG. 14. The overall control system may begin (step 400) by permitting a new collection bin at each station to be assigned to a group of objects based on overall system parameters (step 402) as discussed in more detail below. The system then identifies assigned bins correlated with objects at each station (step 404), and updates the number of objects at each bin at each station (step 406). The system then determines that when a bin is either full or the system expects that the associated sorting station is unlikely to see another object associated with the bin, the associated sorting station robotic system will then place the completed bin onto an output conveyor, or signal a human worker to come and empty the bin (step 408), and then return to step 402.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

While the assignment of objects to destinations is fixed (e.g., each object has an identifier such as a label or barcode that is associated with an assigned destination), systems of certain embodiments may employ carriages or other containers that are not each fixed to assigned destinations, but rather may be dynamically assigned during operation. In other words, the system assigns carriages or containers to certain destination stations responsive to a wide variety of inputs, such as volume of objects being moved to a single destination, the frequency of sortation of the type of object, or even assigning the next available carriage or container to a destination associated with an acquired object.

The system provides in a specific embodiment an input system that interfaces to the customer's conveyors and containers, stores parcels for feeding into the system, and feeds those parcels into the system at a moderate and controllable rate. In one embodiment, the interface to the customer's process takes the form of a Gaylord dumper, but many other embodiments are possible. In one embodiment, feeding into the system is by an inclined cleated conveyor with overhead baffles. A key to the efficient operation of the system is to feed parcels in at a modest controlled rate. Many options are available, including variations in the conveyor slope and speed, the presence, size and structure of cleats and baffles, and the use of sensors to monitor and control the feed rate.

The system includes in a specific embodiment a primary perception system that monitors the stream of parcels on the primary conveyor. Where possible the primary perception system may identify the parcel to speed or simplify subsequent operations. For example, knowledge of the parcels on the primary conveyor may enable the system to make better choices on whether to pick up a parcel rather than let it pass to the exception bin, which parcels to pick up first, or on how to allocate output bins.

Those skilled in the art will appreciate that numerous modifications and variations may be made to the above disclosed embodiments without departing from the spirit and scope of the present invention.

What is claimed is:

1. An object processing system for providing processing of objects within a trailer for a tractor trailer, said system comprising:
    an input bin disposed at a rear of the trailer for receiving a plurality of objects to be processed;
    a singulation system within the trailer for providing a singulated stream of the plurality of objects in, at least in part, an upward direction within the trailer, wherein the singulation system comprises at least one conveyor for transporting the objects from the input bin towards a top of the trailer and one or more diverters that selectively return one or more of the objects from the at least one conveyor to the input bin to provide the singulated stream of objects; and
    a perception system that includes a plurality of perception units, said perception system for receiving the singulated stream of objects from the at least one conveyor of the singulation system, wherein the plurality of perception units generate perception data for identifying each object among the singulated stream of objects that are passed one at a time through the interior of the perception system.

2. The object processing system as claimed in claim 1, wherein the singulation system includes a cleated conveyor.

3. The object processing system as claimed in claim 2, wherein the cleated conveyor includes a portion that is located at the input bin.

4. The object processing system as claimed in claim 1, wherein the perception system includes a drop perception unit with an open top and an open bottom, and wherein the plurality of perception units are positioned between the open top and the open bottom.

5. The object processing system as claimed in claim 4, wherein the open bottom is positioned above a primary transport system for transporting each object in one of two primary transport directions responsive to perception data provided by at least one of the plurality of perception units.

6. The object processing system as claimed in claim 5, wherein the object processing system further includes a secondary transport system for transporting each object in one of two secondary directions responsive to the perception data.

7. The object processing system as claimed in claim 6, wherein the two secondary directions are mutually orthogonal to the two primary directions.

8. The object processing system as claimed in claim 6, wherein the secondary transport system includes at least one carriage.

9. The object processing system as claimed in claim 8, wherein the secondary transport system includes a plurality of carriages that run along a plurality of carriage tracks.

10. The object processing system as claimed in claim 1, wherein the object processing system further includes a plurality of output stations at which any of the plurality of objects may be presented, said plurality of output stations being accessible from outside the trailer.

11. A object processing system for providing processing of objects within a trailer for a tractor trailer, said system comprising:
    a singulation system within the trailer for providing a singulated stream of a plurality of objects in, at least in part, an upward direction within the trailer, wherein the singulation system comprises at least one conveyor for transporting the objects from an input bin towards a top of the trailer and one or more diverters that selectively return one or more of the objects from the at least one conveyor to the input bin to provide the singulated stream of objects; and
    a drop perception system that includes a plurality of perception units, said drop perception system for receiving the singulated stream of objects from the at least one conveyor of the singulation system, wherein the plurality of perception units generate perception data for identifying each object among the singulated stream of objects that are dropped one at a time through the interior of the drop perception system.

12. The object processing system as claimed in claim 11, wherein the singulation system includes a cleated conveyor.

13. The object processing system as claimed in claim 12, wherein the cleated conveyor includes a portion that is located at an input bin.

14. The object processing system as claimed in claim 11, wherein the drop perception system includes an open top and an open bottom, and wherein the plurality of perception units are positioned between the open top and the open bottom.

15. The object processing system as claimed in claim 14, wherein the open bottom is positioned above a primary transport system for transporting each object in one of two primary transport directions responsive to perception data provided by at least one of the plurality of perception units.

16. The object processing system as claimed in claim 15, wherein the object processing system further includes a secondary transport system for transporting each object in one of two secondary directions responsive to the perception data.

17. The object processing system as claimed in claim 16, wherein the two secondary directions are mutually orthogonal to the two primary directions.

18. The object processing system as claimed in claim 16, wherein the secondary transport system includes at least one carriage.

19. The object processing system as claimed in claim 18, wherein the secondary transport system includes a plurality of carriages that run along a plurality of carriage tracks.

20. The object processing system as claimed in claim 11, wherein the object processing system further includes a plurality of output stations at which any of the plurality of objects may be presented, said plurality of output stations being accessible from outside the trailer.

21. A object processing system for providing processing of objects within a trailer for a tractor trailer, said system comprising:
- a singulation system within the trailer for providing a singulated stream of a plurality of objects in, at least in part, an upward direction within the trailer, wherein the singulation system comprises at least one conveyor for transporting the objects from the input bin towards a top of the trailer and one or more diverters that selectively return one or more of the objects from the at least one conveyor to the input bin to provide the singulated stream of objects;
- a perception system that includes a plurality of perception units, said perception system for receiving the singulated stream of objects from the at least one conveyor of the singulation system, wherein the plurality of perception units generate perception data for identifying each object among the singulated stream of objects that are passed one at a time through the interior of the perception system; and
- a plurality of output stations, each of which is accessible from an outside of the trailer.

22. The object processing system as claimed in claim 21, wherein the singulation system includes a cleated conveyor.

23. The object processing system as claimed in claim 22, wherein the cleated conveyor includes a portion that is located at an input bin.

24. The object processing system as claimed in claim 21, wherein the perception system includes a drop perception unit with an open top and an open bottom, and wherein the plurality of perception units are positioned between the open top and the open bottom.

25. The object processing system as claimed in claim 24, wherein the open bottom is positioned above a primary transport system for transporting each object in one of two primary transport directions responsive to perception data provided by at least one of the plurality of perception units.

26. The object processing system as claimed in claim 25, wherein the object processing system further includes a secondary transport system for transporting each object in one of two secondary directions responsive to the perception data.

27. The object processing system as claimed in claim 26, wherein the two secondary directions are mutually orthogonal to the two primary directions.

28. The object processing system as claimed in claim 26, wherein the secondary transport system includes at least one carriage.

29. The object processing system as claimed in claim 28, wherein the secondary transport system includes a plurality of carriages that run along a plurality of carriage tracks.

30. The object processing system as claimed in claim 21, wherein the plurality of output stations each include a bagging system for bagging and sealing a subset of the plurality of objects.

* * * * *